US011976882B2

(12) United States Patent
Blay et al.

(10) Patent No.: US 11,976,882 B2
(45) Date of Patent: May 7, 2024

(54) HEAT REJECTION APPARATUS, PLUME ABATEMENT SYSTEM, AND METHOD

(71) Applicant: Baltimore Aircoil Company, Inc., Jessup, MD (US)

(72) Inventors: Preston Blay, Silver Spring, MD (US); Yoon K. Shin, Ellicott City, MD (US); David Andrew Aaron, Reisterstown, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 80 days.

(21) Appl. No.: 17/532,259

(22) Filed: Nov. 22, 2021

(65) Prior Publication Data

US 2022/0163263 A1   May 26, 2022

Related U.S. Application Data

(60) Provisional application No. 63/117,244, filed on Nov. 23, 2020.

(51) Int. Cl.
*F28C 1/16* (2006.01)
*F28C 1/14* (2006.01)
(Continued)

(52) U.S. Cl.
CPC .............. *F28C 1/14* (2013.01); *F28F 27/003* (2013.01); *F28C 2001/006* (2013.01)

(58) Field of Classification Search
CPC ........ F28C 1/14; F28C 1/16; F28C 2001/006; F28F 27/003
(Continued)

(56) References Cited

U.S. PATENT DOCUMENTS 3,367,413 A    2/1968  Forster
3,411,758 A *  11/1968 Edmondson .............. F28C 1/00
                                                                        261/24
(Continued)

FOREIGN PATENT DOCUMENTS

CA    2808810        9/2013
DE    3030439 A1     3/1982
(Continued)

OTHER PUBLICATIONS

3C Condenser Heat Rejection Systems—SH09 Series Microchannel, Installation, Operation & Maintenance Manual; Muller Industries; publicly available before Jan. 20, 2014; 30 pages.

(Continued)

*Primary Examiner* — Charles S Bushey
(74) *Attorney, Agent, or Firm* — Fitch, Even, Tabin & Flannery LLP

(57) ABSTRACT

In one aspect, a heat rejection apparatus is provided including an evaporative heat exchanger and a primary fan operable to direct first ambient air into an air inlet, cause the first ambient air to interact with the evaporative heat exchanger to produce heated air, and discharge the heated air from an air outlet. The heat rejection apparatus includes a plume abatement fan operable to direct second ambient air into contact with the heated air downstream of the evaporative heat exchanger and a controller operably coupled to the primary fan and the plume abatement fan. The controller has a plume abatement mode wherein the controller operates the plume abatement fan to cause the plume abatement fan to direct the second ambient air into contact with the heated air to cool the heated air and abate plume.

34 Claims, 13 Drawing Sheets

(51) Int. Cl.
   *F28F 27/00* (2006.01)
   *F28C 1/00* (2006.01)
(58) Field of Classification Search
   USPC .................................................. 261/DIG. 77
   See application file for complete search history.

(56) References Cited

U.S. PATENT DOCUMENTS

| | | | |
|---|---|---|---|
| 3,754,738 A | 8/1973 | Blazer | |
| 3,923,935 A | 12/1975 | Cates | |
| 3,925,523 A * | 12/1975 | Cates | F28C 1/14 |
| | | | 261/DIG. 11 |
| 3,994,999 A * | 11/1976 | Phelps | F28F 25/08 |
| | | | 261/DIG. 11 |
| 3,998,394 A | 12/1976 | Ovard | |
| 4,022,853 A * | 5/1977 | Schulenberg | F28C 1/14 |
| | | | 261/DIG. 11 |
| 4,028,440 A | 6/1977 | Engalitcheff, Jr. | |
| 4,076,771 A | 2/1978 | Houx, Jr | |
| 4,315,873 A * | 2/1982 | Smith | F28C 1/14 |
| | | | 261/DIG. 11 |
| 4,418,023 A | 11/1983 | Dolan | |
| 4,514,344 A * | 4/1985 | Ruscheweyh | B01F 25/3141 |
| | | | 261/DIG. 11 |
| 4,637,225 A | 1/1987 | Marshall | |
| 4,662,902 A | 5/1987 | Meyer-Pittroff | |
| 5,226,285 A | 7/1993 | Dankowski | |
| 5,273,687 A | 12/1993 | Osborne | |
| 5,431,858 A | 7/1995 | Harrison, Jr. | |
| 5,435,382 A | 7/1995 | Carter | |
| 5,449,036 A | 9/1995 | Genge | |
| 5,585,047 A | 12/1996 | Mortensen | |
| 5,724,828 A | 3/1998 | Korenic | |
| 5,775,409 A | 7/1998 | Goto | |
| 5,816,315 A | 10/1998 | Stark | |
| 5,816,318 A | 10/1998 | Carter | |
| 5,944,094 A | 8/1999 | Kinney, Jr. | |
| 5,994,094 A | 11/1999 | Hoetten | |
| 6,047,555 A | 4/2000 | Weng | |
| 6,142,219 A | 11/2000 | Korenic | |
| 6,213,200 B1 | 4/2001 | Carter | |
| 6,247,682 B1 | 6/2001 | Vouche | |
| 6,260,830 B1 | 7/2001 | Harrison | |
| 6,427,461 B1 | 8/2002 | Whinery | |
| 6,446,941 B1 | 9/2002 | Maheshwari | |
| 6,564,864 B2 | 5/2003 | Carter | |
| 6,574,980 B1 | 6/2003 | Morrison | |
| 6,663,694 B2 | 12/2003 | Hubbard | |
| 6,684,943 B2 | 2/2004 | Dobbs | |
| 7,107,782 B2 | 9/2006 | Carter | |
| 7,128,310 B2 | 10/2006 | Mockry | |
| 7,310,958 B2 | 12/2007 | Carter | |
| 7,328,886 B2 | 2/2008 | Mockry | |
| 7,484,718 B2 | 2/2009 | Facius | |
| 7,603,774 B2 | 10/2009 | Facius | |
| 7,802,774 B2 | 9/2010 | Facius | |
| 8,412,357 B2 | 4/2013 | Seem | |
| 8,434,746 B2 | 5/2013 | Carter | |
| 8,483,883 B1 | 7/2013 | Watson | |
| 8,676,385 B2 | 3/2014 | Myers | |
| 8,833,741 B2 | 9/2014 | Mockry | |
| 8,876,090 B2 | 11/2014 | Vouche | |
| 9,004,463 B2 | 4/2015 | Carter | |
| 9,057,563 B2 | 6/2015 | Carter | |
| 9,057,564 B2 | 6/2015 | Carter | |
| 9,182,753 B2 | 11/2015 | Benosman | |
| 9,243,847 B2 | 1/2016 | Benz | |
| 9,255,739 B2 | 2/2016 | Aaron | |
| 9,279,619 B2 | 3/2016 | Aaron | |
| 9,383,141 B2 | 7/2016 | Vouche | |
| 9,587,885 B2 | 3/2017 | Aaron | |
| 9,995,533 B2 | 6/2018 | Aaron | |
| 10,132,577 B2 | 11/2018 | Martell | |
| 10,222,146 B2 | 3/2019 | Mockry | |
| 10,288,351 B2 | 5/2019 | Aaron | |
| 10,309,734 B2 | 6/2019 | Mockry | |
| 10,365,001 B2 | 7/2019 | Salsbury | |
| 10,401,843 B2 | 9/2019 | House | |
| 10,408,541 B2 * | 9/2019 | Seawell | F28C 1/14 |
| 10,415,902 B2 | 9/2019 | Shin | |
| 10,619,953 B2 | 4/2020 | Blay | |
| 10,627,176 B2 | 4/2020 | Shin | |
| 10,677,543 B2 | 6/2020 | Auth | |
| 11,029,093 B2 | 6/2021 | Shin | |
| 11,092,394 B2 | 8/2021 | Blay | |
| 11,287,191 B2 | 3/2022 | Aaron | |
| 2003/0070547 A1 | 4/2003 | Hubbard | |
| 2003/0071373 A1 | 4/2003 | Hubbard | |
| 2004/0080060 A1 | 4/2004 | Mockry | |
| 2004/0196631 A1 | 10/2004 | Ueda | |
| 2004/0231824 A1 | 11/2004 | Paolillo | |
| 2005/0012230 A1 | 1/2005 | Kammerzell | |
| 2005/0077637 A1 | 4/2005 | Mockry | |
| 2007/0101746 A1 | 5/2007 | Schlom | |
| 2007/0187851 A1 | 8/2007 | Facius | |
| 2008/0018001 A1 | 1/2008 | Kammerzell | |
| 2008/0041087 A1 | 2/2008 | Muller | |
| 2008/0115921 A1 | 5/2008 | Hall | |
| 2010/0010681 A1 | 1/2010 | Zugibe | |
| 2010/0154448 A1 | 6/2010 | Hay | |
| 2010/0281896 A1 | 11/2010 | Al Watban | |
| 2010/0315770 A1 | 12/2010 | Tipley | |
| 2010/0326091 A1 | 12/2010 | Enayati | |
| 2011/0100593 A1 | 5/2011 | Benz | |
| 2011/0113798 A1 | 5/2011 | Pichai | |
| 2011/0168354 A1 | 7/2011 | De Jong | |
| 2011/0227236 A1 | 9/2011 | Vouche | |
| 2011/0289951 A1 | 12/2011 | Furlong | |
| 2012/0067546 A1 | 3/2012 | Bugler, III | |
| 2013/0113127 A1 | 5/2013 | Yang | |
| 2013/0175717 A1 | 7/2013 | Boonyasopath | |
| 2013/0228941 A1 | 9/2013 | Bogh | |
| 2014/0209279 A1 | 7/2014 | Aaron | |
| 2014/0216688 A1 | 8/2014 | Shelnutt | |
| 2014/0229146 A1 | 8/2014 | Gonzalez | |
| 2015/0068708 A1 | 3/2015 | Mockry | |
| 2015/0069643 A1 | 3/2015 | Mockry | |
| 2016/0018125 A1 | 1/2016 | Hamstra | |
| 2016/0178262 A1 | 6/2016 | Rocha | |
| 2016/0313751 A1 | 10/2016 | Risbeck | |
| 2016/0363388 A1 | 12/2016 | Egolf | |
| 2017/0003078 A1 | 1/2017 | Vadder | |
| 2017/0284742 A1 | 10/2017 | Aaron | |
| 2018/0100700 A1 | 4/2018 | Beaver | |
| 2018/0100701 A1 | 4/2018 | Beaver | |
| 2018/0100703 A1 | 4/2018 | Beaver | |
| 2018/0202710 A1 | 7/2018 | Miller | |
| 2018/0224174 A1 | 8/2018 | Hollander | |
| 2019/0145721 A1 | 5/2019 | Blay | |
| 2019/0195524 A1 | 6/2019 | Carter | |
| 2019/0212075 A1 | 7/2019 | Shin | |
| 2020/0300553 A1 | 9/2020 | Aaron | |
| 2021/0180891 A1 | 6/2021 | Rousselet | |

FOREIGN PATENT DOCUMENTS

| | | |
|---|---|---|
| EP | 0172403 B1 | 3/1988 |
| EP | 0264316 A1 | 4/1988 |
| EP | 0365815 B2 | 8/1999 |
| EP | 1698847 | 9/2006 |
| JP | 2007285620 A | 11/2007 |
| KR | 101663258 B1 | 10/2016 |
| WO | 2005005905 | 1/2005 |
| WO | 2007015281 | 2/2007 |
| WO | 2010020160 | 2/2010 |
| WO | 2010037164 | 4/2010 |
| WO | 2012114134 A1 | 8/2012 |
| WO | 2015059038 | 4/2015 |
| WO | 2018004464 | 1/2018 |

OTHER PUBLICATIONS

(56) References Cited

OTHER PUBLICATIONS

Arteaga, Johnathan A.F. et al.; Prediction Method for the Performance of a Chiller Following a Cooling Load Profile; CONEM 2010 VI National Congress of Mechanical Engineering, Aug. 18-21, 2010 Campina Grande, Paraiba, Brazil; 10 pages.

Baltimore Aircoil Company; Chapter 15: Plume Abatement; pp. 87-88; publicly available before Mar. 19, 2019; 2 pages.

Baltimore Aircoil Company; product overview of HXC: Principle of Operation from https://www.baltimoreaircoil.eu/en/products/HXC-principle-of-operation; publicly available before Mar. 19, 2019; 1 page.

Baltimore Aircoil International nv; Product Report: BAC's Expertise from plume prediction to solution brochure; publicly available before Mar. 19, 2019; 2 pages.

Bonneville Power Administration; Electric Ideas Clearinghouse—Bulletin Board—Technology Update: Optimizing Cooling Tower Performance; Nov. 1991; 4 pages.

Carrier Corporation; Carrier® Chiller System Profiles—A Guide for Chilled Water Plant Operation; brochure; Copyright 1998; 4 pages.

Chan, Man Him; Cooling Tower Performance Analysis and Visible Air Plume Abatement in Building Situated in Temperate Climate Zone; Thesis submitted to the Welsh School of Architecture, Cardiff University for the dgree of PhD, Jun. 2015; 193 pages.

Chilled Water System Analysis Tool (CWSAT), Version 2.1—User's Manual; Oct. 2005; The University of Massachusetts College of Engineering Department of Mechanical & Industrial Engineering, Amherst, MA; 34 pages.

Conserve it PTY LTD; PlantPRO® brochure from https://www.conserveitiot.com/plantpro; publicly available before Dec. 11, 2019; 13 pages.

CoolTools™ Chilled Water Plant Design Guide; Energy Design Resources; Dec. 2009; 281 pages.

DeepMind AI Reduces Google Data Centre Cooling Bill by 40%; Blog Post from https://deepmind.com/blog/article/deepmind-ai-reduces-google-data-centre-cooling-bill-40; Jul. 20, 2016; 6 pages.

Dempster, Ian; Machine Learning and Chiller System Optimization; brochure from https://www.districtenergy.org/HigherLogic/System/DownloadDocumentFile.ashx?DocumentFileKey=455e8aa2-5764-d402-ecda-89078853ddc7; Feb. 2015; 13 pages.

Deru, Michael et al.; U.S. Department of Energy Commercial Reference Building Models of the National Building Stock; Technical Report NREL/TP-5500-46861; National Renewable Energy Laboratory; Feb. 2011; 118 pages.

Energy Center of Wisconsin; Fact Sheet: Evaporative Condenser Control—Techniques to Cut Energy Waste in Large Refrigeration Systems; Copyright 2001; 2 pages.

Fan, Guo-Feng et al.; Application of the Weighted K-Nearest Neighbor Algorithm for Short-Term Load Forecasting; Energies 2019, 12, 916; doi:10.3390/en12050916; 19 pages; published Mar. 9, 2019.

Furlong, James W. et al; Optimization of Water—Cooled Chiller—Cooling Tower Combinations; CTI Journal, vol. 26, No. 1; p. 12-19; 2005; 8 pages.

García Cutillas, Clemente et al.; Optimum Design and Operation of an HVAC Cooling Tower for Energy and Water Conservation; Energies 2017, 10, 299; doi: 10.3390/en10030299; 27 pages; published Mar. 3, 2017.

Geister, W. Ryan et al.; A Closer Look at Chiller Ratings; ASHRAE Journal; Dec. 2009, p. 22-32; 8 pages.

GNV GL; Impact Evaluation of 2012 National Grid-Rhode Island Prescriptive Chiller Program; report prepared by KEMA, Inc.; Jul. 22, 2016; 35 pages.

Goel, S. et al.; Enhancements to ASHRAE Standard 90.1 Prototype Building Models; Prepared for the U.S. Department of Energy under Contract DE-AC05-76RL01830 by Pacific Northwest National Laboratory, Richland WA 99352; Apr. 2014; 59 pages.

Green Koncepts Pte Ltd; Chiller Plant Optimisation—Ultra Low Energy Management with IoT & Machine Learning Controls; brochure from http://greenbuildingreview.com/wp-content/uploads/2017/10/Track-1.3-Smart-Building-Roy-Arindam.pdf; publicly available before Dec. 11, 2019; 12 pages.

Hattori, Yuki et al.; The Relationship Between Heat Load Profile and Energy Efficiency in District heating and Cooling Plant; Proceedings of Building Simulation 2011: 12th Conference of International Building Performance Simulation Association, Sydney, Nov. 14-16; p. 1926-1933; 8 pages.

Ho, Simon; Trane® High Performance Chilled Water Systems; presentation; EarthWise HVAC Chiller—Tower Systems; Ingersoll Rand, Inc.; Sep. 2012; 18 pages.

Hydeman, Mark et al.; PG&E's CoolTools™ Project: A Toolkit to Improve Evaluation and Operation of Chilled Water Plants; Pacific Gas and Electric Company; Sep. 1997; 24 pages.

Hydronic and Heat Pump Control features from https://www.75f.io/solutions/equipment-type/hydronic-heat-pump-control; publicly available before Dec. 11, 2019; 8 pages.

Ingersoll Rand, Inc.; Trane® New myPLV Tool Provides Quick, Simple Option for Chiller Economic Comparisons; brochure; Feb. 26, 2014; 4 pages.

Jekel, Todd B. et al.; Energy Efficiency Improvements; Industrial Refrigeration Consortium at the University of Wisconsin Madison, WI; Reta National Conference 2017; 78 pages.

Jekel, Todd; Condenser Controls & Control Strategies; presentation at IRC Research & Technology Forum, Madison, WI; May 10-11, 2017; 35 pages.

Johnson Controls; Applying Artifical Intelligence to Built Environments through Machine Learning; brochure from https://www.johnsoncontrols.com/-/media/jci/insights/2019/bts/bts_jci-661_dv_ai_learning_white_paper_020819_4p_f3.pdf; publicly available before Dec. 11, 2019; 4 pages.

Johnson Controls; HVAC&R Engineering Update: Use Only NPLV to Specify Chiller Efficieny; brochure from www.johnsoncontrols.com; Copyright 2009; 4 pages.

Jourdan, Greg; Knowing When Your Chiller Isn't Energy Smart; presentation Energy/Facilities Connections Washington State University; May 6, 2015; 132 pages.

Kim, Jee-Heon et al.; Modeling and Optimizing a Chiller System Using a Machine Learing Algorithm; Energies 2019, 12, 2860; doi:10.3390/en12152860; 13 pages; published Jul. 25, 2019.

Klawunder, Shawn Eric; Thesis: Modeling and Analysis of Chilled Water Systems; Requirement for the Degree Master of Science in Mechanical Engineering at Georgia Institute of Technology, Apr. 2000; 158 pages.

Lee, W.L. et al.; Developing a Simplified Model for Evaluating Chiller-System Configurations; Applied Energy 84 (2007) 290-306; 17 pages.

Lei, Zhao et al.; Dynamic Simulation and Analysis of a Water Chiller Refrigeration System; Applied Thermal Engineering 25 (2005) 2258-2271; 14 pages.

Li, Xiao et al.; Self-Optimizing Control of Cooling Tower for Efficient Operation of Chilled Water Systems; Purdue University School of Mechanical Engineering, International High Performance Buildings Conference 2012; Paper 62; http://docs.lib.purdue.edu/ihpbc/62; 11 pages.

Lindahl, Jr., Paul; Jameson, Randall W.; Plume Abatement and Water Conversation with the Wet/Dry Cooling Tower; Presented at the 1993 Cooling Tower Institute Annual Meeting, Technical Paper No. TP93-01; Feb. 1993; 33 pages.

Marley Clearsky® Plume Abatement System, brochure from SPX Cooling Technologies, Inc. website http://spxcooling.com/wp-content/uploads/ClearSky-09A.pdf; Aug. 2016; 12 pages.

Marley NCWD insight brochure from SPX Cooling Technologies, Inc. website https://spxcooling.com/library/marley-insight-ncwd/; Mar. 2017; 2 pages.

Marley PPWD Hybrid Plume Abatement web page from SPX Cooling Technologies, Inc. website https://spxcooling.com/cooling-towers/marley-ppwd-hybrid-plume-abatement/; publicly available before Nov. 23, 2020; 4 pages.

Marley Round Hybrid Plume Abatement web page from SPX Cooling Technologies, Inc. website https://spxcooling.com/cooling-towers/marley-round-hybrid-plume-abatement/; publicly avaiable before Nov. 23, 2020; 5 pages.

(56) References Cited

OTHER PUBLICATIONS

Navitas Captial; Whitepaper: Artificial Intelligence (AI) for the Built World; Jun. 2019; 34 pages.
PCT Search Report and Written Opinion from related International Application No. PCT/US2021/060507 dated Feb. 9, 2022; 23 pages.
Peesel, Ron-Hendrik et al.; Optimization of Cooling Utility System with Continuous Self-Learning Performance Models; Energies 2019, 12, 1926; doi:10.3390/en12101926; 17 pages; published May 20, 2019.
Pugh, Michael D.; Benefits of Water-Cooled Systems vs Air-Cooled Systems for Air-Conditioning Applications; presentation from Cooling Technology Institute (www.cti.org); publicly available before Dec. 11, 2019; 102 pages.
Schwedler, Mick et al.; Tower Water Temperature . . . Control It How ??!; Engineers Newsletter, vol. 24, No. 1, 1995; The Trane Company; 5 pages.
Schwedler, Mick; Condenser Water System Savings—Optimizing Flow Rates and Control; Engineers Newsletter, vol. 41, No. 3; Trane® a business of Ingersoll Rand; Sep. 2012; 8 pages.
SPX Cooling Technologies, Inc.; Marley® Improving Energy Efficiency in Cooling Tower Design; presentation; publicly available before Dec. 11, 2019; 24 pages.
Stocki, Michael et al.; Benchmarking an Energy Evaluation Tool for Chilled Water Systems; published by The American Counsil for an Energy-Efficient Economy (ACEEE); 2001; p. 429-440; 12 pages.
Sullivan, Brian; Chiller Selection Made Easier with myPLV™; Engineers Newsletter, vol. 44, No. 4; Trane® a business of Ingersoll Rand; Dec. 2015; 12 pages.
Taylor, Steven T.; Optimizing Design & Control of Chilled Water Plants—Part 5: Optimized Control Sequences; ASHRAE Journal; Jun. 2012; p. 56-74; 20 pages.
Tiessen, Alex et al.; Chapter 14: Chiller Evaluation Protocol—The Uniform Methods Project: Methods for Determining Energy Efficiency Savings for Specific Measures; Subcontract Report NREL/SR-7A40-62431; National Renewable Energy Laboratory; Sep. 2014; 24 pages.
TrilliumSeries™ Condenser—Rigging, Operation & Maintenance Manual; Baltimore Aircoil Company; M450/I-E; 2013; 20 pages.
TrilliumSeries™ Condenser; brochure from Baltimore Aircoil Company; S410/I-C; 2013; 12 pages.
U.S. Department of Energy—Hospital Energy Alliance; Fact Sheet: Hospitals Benefit by Improving Inefficient Chiller Systems; Aug. 2011; 2 pages.
Vallabhaneni, Kavita A.; Benefits of Water-Cooled Systems vs. Air-Cooled Systems for Air-Conditioning Applications; presentation from Cooling Technology Institute (www.cti.org); publicly available before Dec. 11, 2019; 88 pages.

\* cited by examiner

HEAT REJECTION APPARATUS, PLUME ABATEMENT SYSTEM, AND METHOD

CROSS-REFERENCE TO RELATED APPLICATION

This application claims the benefit of U.S. Provisional Patent App. No. 63/117,244, filed Nov. 23, 2020, which is hereby incorporated herein by reference in its entirety.

FIELD

This disclosure relates to plume abatement systems, and, more specifically, to plume abatement systems for heat rejection apparatuses having evaporative heat exchangers.

BACKGROUND

A heat rejection apparatus, such as a cooling tower, may utilize one or more evaporative heat exchangers to cool process fluid. As used herein, the term evaporative heat exchanger refers to a heat exchanger that utilizes evaporative cooling to cool process fluid. Evaporative heat exchangers utilized in cooling towers may include direct evaporative heat exchangers, such as fill sheets, wherein the process fluid is cooled directly by airflow. Alternatively, evaporative heat exchangers utilized in cooling towers may include indirect evaporative heat exchangers wherein the process fluid is separated from cooling airflow by an intervening structure. For example, an indirect evaporative heat exchanger may include one or more serpentine circuit tubes or plate cassettes having interiors through which process fluid travels and an evaporative liquid distribution assembly that distributes evaporative liquid onto outer surfaces of the serpentine circuit tubes.

Evaporative heat exchangers often utilize water as the process fluid. Under certain atmospheric conditions, particularly in cold environments, the evaporative heat exchange process can result in plumes of evaporated water vapor rising from the cooling tower. Under certain atmospheric conditions, when the evaporated water vapor or moisture is too dense and too concentrated to be immediately absorbed by the ambient air, the water vapor plume becomes visible. With little to no wind above the cooling tower, plumes may rise in a generally vertical direction. In light to heavy wind conditions, the plume may follow a wind path. Depending on ambient conditions and the size of the cooling tower, plumes may extend anywhere from several feet to several thousand feet from the cooling tower. As the moisture in the concentrated cooling tower exhaust air mixes with the ambient air, it eventually is absorbed and dissipates until the plume cannot be seen.

Large plumes may be undesirable, particularly near airports and in cities, as plumes can cause fog conditions. Furthermore, plumes can obstruct or otherwise impinge views and may appear to observers as pollutant-carrying smoke.

DETAILED DESCRIPTION

Figure 1:
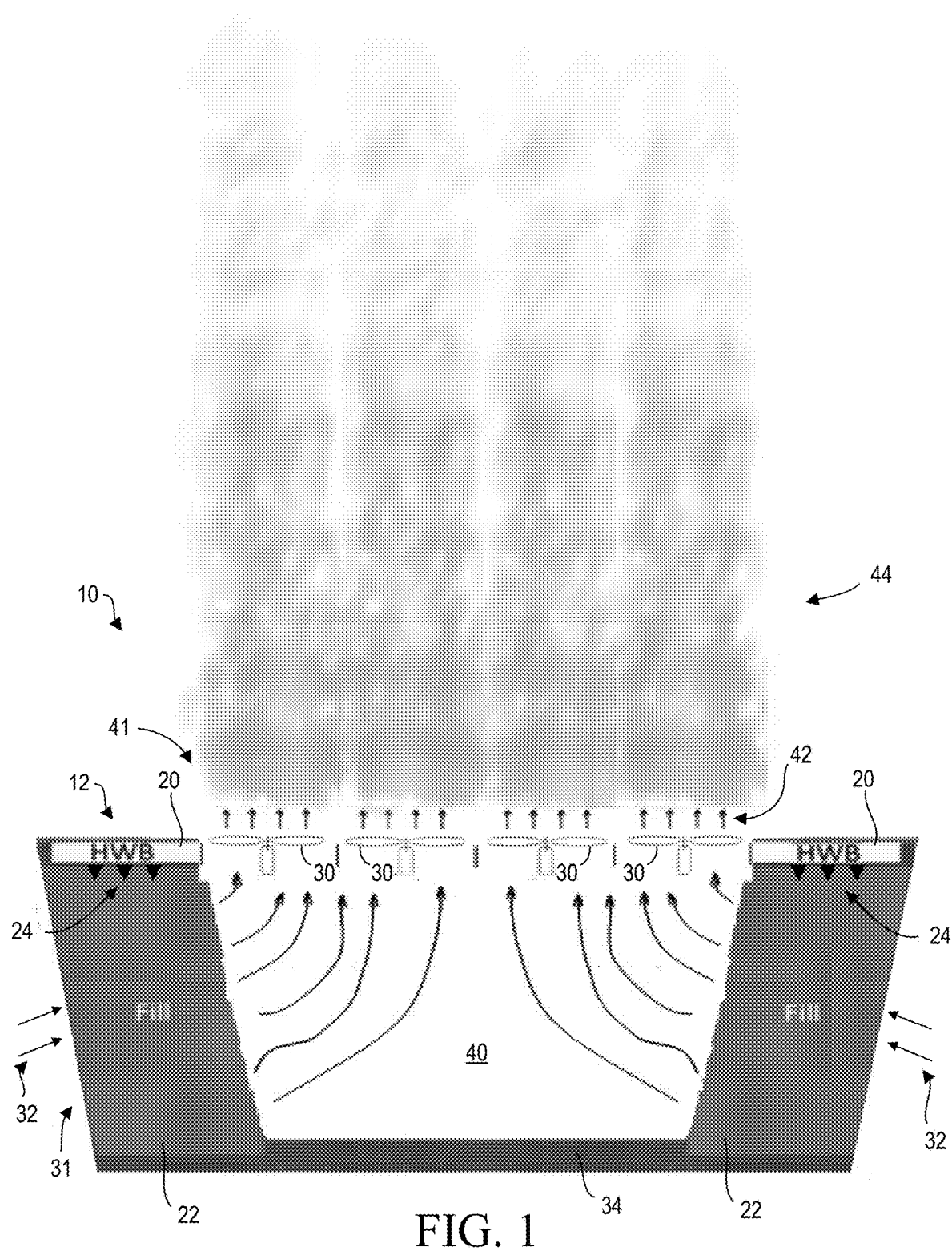
FIG. 1 is a schematic view of a first cooling tower including a direct evaporative heat exchanger and visible plume rising from the cooling tower.

In one aspect of the present disclosure, a heat rejection apparatus is provided that includes an evaporative heat exchanger configured to cool a process fluid. The evaporative heat exchanger may include a direct heat exchanger and/or an indirect heat exchanger. The heat rejection apparatus includes at least one primary fan operable to direct first ambient air into an air inlet of the heat rejection apparatus, cause the first ambient air to interact with the evaporative heat exchanger to produce heated air with increased water content, and discharge the heated air from an air outlet of the heat rejection apparatus. The heat rejection apparatus further includes at least one plume abatement fan operable to direct an ambient air to bypass the evaporative heat exchanger and to come into contact with and mix with the heated air. Adding cooler, ambient air from the at least one plume abatement fan to the heated air leaving the evaporative heat exchanger reduces the difference between the temperature of the heated air leaving the evaporative heat exchanger and the ambient air which reduces the risk of plume formation as the mixed airstreams leave the cooling tower. The heat rejection apparatus includes a controller operably coupled to the at least one primary fan and the at least one plume abatement fan. The controller is configured to receive data from one or more sensors and/or from a remote computer. Based on the data, when the controller is in a plume abatement mode, the controller determines whether to operate at least one plume abatement fan to direct ambient air into the cooling tower to contact and mix with the heated air leaving the evaporative heat exchanger.

In one embodiment, the at least one plume abatement fan is operable to direct ambient air into contact and mix with the heated air within the heat rejection apparatus such as within a plenum of the heat rejection apparatus downstream of the evaporative heat exchanger. Alternatively or additionally, the at least one plume abatement fan is operable to direct ambient air to contact and mix with the heated air outside of the heat rejection apparatus. For example, the at least one plume abatement fan may include at least one plume abatement fan mounted adjacent to the outlet of the heat rejection apparatus and configured to direct ambient air to contact and mix with the heated cooling tower exhaust air upon the heated air leaving the outlet of the heat rejection apparatus.

In one embodiment, the at least one primary fan include a plurality of fans and the plume abatement fan includes a plurality of fans. The controller has a cooling mode wherein the controller causes the primary fans and the plume abatement fans to rotate in first directions so that the primary fans and plume abatement fans cooperate to direct first ambient air into the air inlet, cause the first ambient air to interact with the evaporative heat exchanger to produce heated air, and discharge the heated air from the air outlet. Upon the controller determining to operate in the plume abatement mode, the controller causes the plume abatement fans to rotate in opposite, second directions while rotating the primary fans in the first directions. The rotation of the plume abatement fans in the second directions causes the plume abatement fans to direct ambient air to contact and mix with the heated air to cool and reduce the water content of the heated air before leaving the cooling tower.

In one aspect of the present disclosure, a method for abating plume at a heat rejection apparatus is provided. The method includes drawing a first stream of ambient air into the heat rejection apparatus and directing the first stream of ambient air to flow relative to an evaporative heat exchanger such that the first stream of ambient air absorbs heat from the evaporative heat exchanger to form a heated air mixture within the heat rejection structure. The method further includes drawing a second stream of ambient air into the heat rejection structure such that the second stream of ambient air bypasses the evaporative heat exchanger mixes with the heated air discharged from the evaporative heat exchanger within the heat rejection structure and forms a cooled air mixture before leaving the cooling tower. The second stream of ambient air is drawn (e.g., via a fan) into the heat rejection structure without traveling through the evaporative heat exchanger. The second stream of ambient air may have a temperature less than a temperature of the heated evaporative heat exchanger exhaust air within the heat rejection structure. The method further includes discharging the cooled air mixture from the heat rejection structure.

The method may include rotating a first fan in a first direction to draw the first stream of ambient air through the evaporative heat exchanger, and may include rotating a second fan in a second direction opposite the first direction to draw the second stream of ambient air into the heat rejection structure. After discharging the cooled air mixture from the heat rejection structure, the method may include directing a third stream of ambient air into the cooled air mixture to further cool and reduce the moisture content the discharged cooled air mixture, thereby abating plume.

In another aspect of the present disclosure, a plume abatement system is provided for a heat rejection structure. The plume abatement system may be an evaporative heat exchanger aftercooler. The system includes a first fan for drawing a first stream of ambient air through an evaporative heat exchanger and into the heat rejection structure such that the first stream of ambient air absorbs heat from the evaporative heat exchanger to form a heated air mixture within the heat rejection structure. The system further includes a second fan for drawing a second stream of ambient air into the heat rejection structure, bypassing the evaporative heat exchanger such that the second stream of ambient air mixes with the heated air leaving the evaporative heat exchanger within the heat rejection structure and forms a cooled air mixture before leaving the heat rejection structure. The second stream is drawn into the heat rejection structure without traveling through the evaporative heat exchanger.

In one approach, a plume abatement determination method may be implemented by a controller of the heat rejection structure. For example, prior to implementing plume abatement measures, the method may include determining, via control logic of a controller, whether a plume is expected to form from the cooling tower given the present and/or anticipated atmospheric conditions. If no plume is expected to form, the method may continue to monitor for potential plume formation. If a plume is expected to form, the method may proceed to determining whether plume abatement can be performed while still satisfying the cooling demand. If the cooling demand would not be satisfied with the implementation of plume abatement measures, the method may continue to monitor for changes in the cooling demand, and may continue to monitor atmospheric conditions for potential plume formation. If the cooling demand would be satisfied with the implementation of plume abatement measures, the routine may proceed to implementing plume abatement measures.

With reference now to FIG. 1, an evaporative system 10 for a heat rejection apparatus such as a cooling tower 12 is shown without plume abatement features. The evaporative system 10 includes hot water basins 20 and evaporative heat exchangers, which may be in the form of crossflow fill 22. In another approach, the evaporative heat exchangers may be evaporative indirect heat exchanger coils containing process fluid. During a cooling process, heated process fluid such as water is pumped into the hot water basins 20. From the hot water basins 20, the heated water is distributed (e.g., via holes or nozzles 24) across the fill 22. The water then flows by gravity down along the fill 22 and is cooled by ambient air, indicated at 32, that is drawn in by one or more primary fans, such as fans 30, through an air outlet 31 to interact with the fill 22. The cooled water is then collected in a cold water basin 34, from which the cooled water is returned to the system process flow.

During the cooling process, a portion of the water traveling along the fill 22 evaporates to form water vapor. The water vapor is drawn into an exhaust plenum 40 of the cooling tower 12, which may be intermediate the fill 22 and the air outlet 31, by the fans 30. The water vapor is then discharged from the cooling tower 12 at an air outlet 41 by the fans 30. Under certain atmospheric conditions, the discharged exhaust air 42 forms one or more plumes 44 at the exterior of the cooling tower 12.

Figure 2:
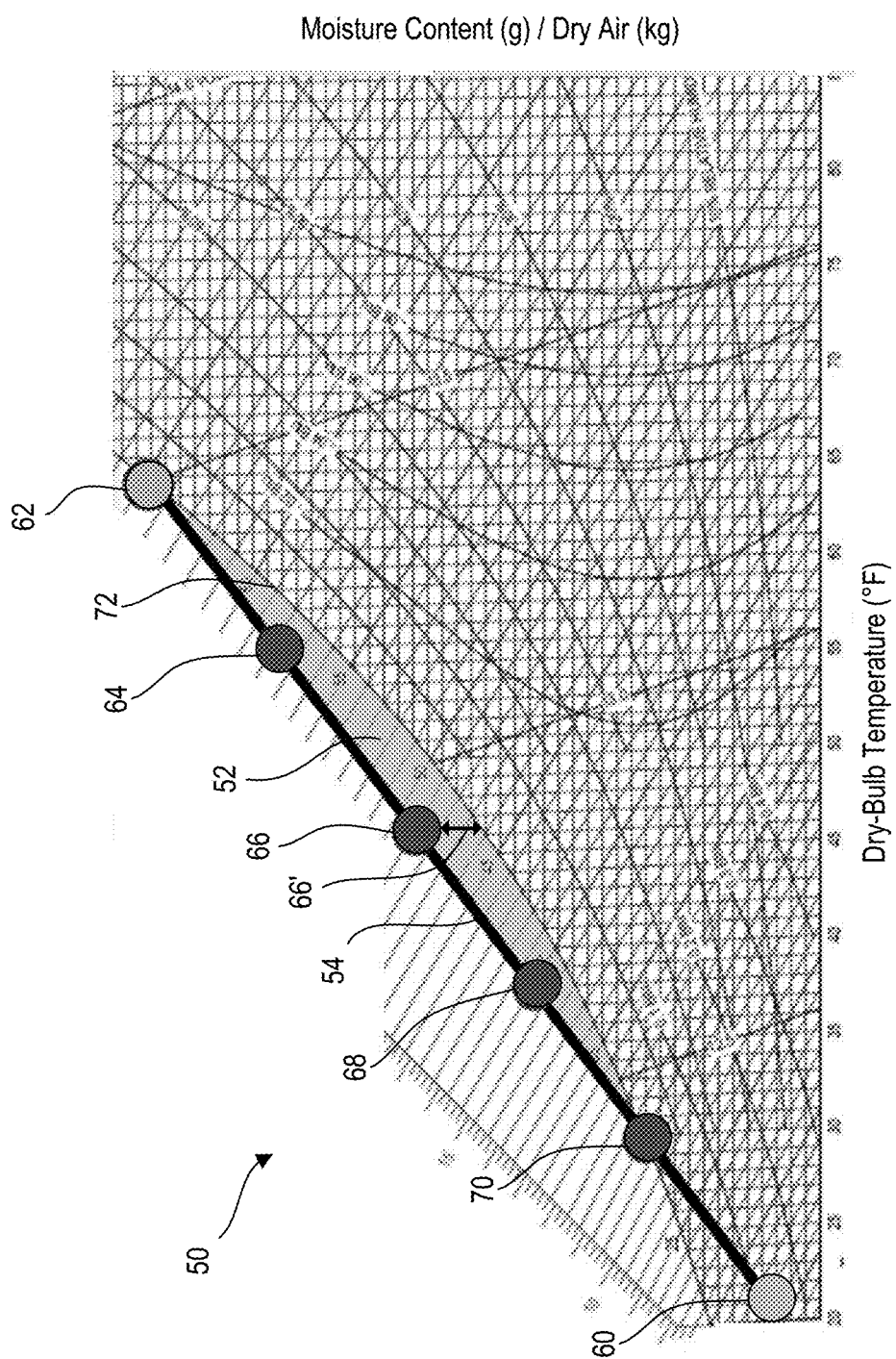
FIG. 2 is a psychrometric chart showing a region of supersaturation conditions whereby plume may be formed by an evaporative heat exchanger of a cooling tower.

More particularly, and referring now to FIG. 2, a psychrometric chart 50 is shown with a plume zone 52 above a saturation curve 72. The plume zone 52 indicates the atmospheric conditions in which pluming may occur when discharged exhaust air 42 contacts the ambient air. Air having conditions that fall within the plume zone 52 is supersaturated air; i.e., the relative humidity of the air is greater than 100%. The excess moisture in the supersaturated air condenses into droplets, and the suspension of the droplets in the air results in plume.

Line 54 depicts air conditions during an example cooling tower air cycle. As discussed, one or more fans 30 draw ambient air into the cooling tower 12. Prior to entering the cooling tower 12, the ambient air is at 21° F. dry bulb and 17° F. wet bulb, as indicated at condition 60. As the air passes across an evaporative heat exchanger (e.g., fill 22 of FIG. 1), the air draws heat and moisture from the heated water traveling through the evaporative heat exchanger. When this heated air is discharged from the cooling tower 12, the discharged exhaust air 42 of FIG. 1 is at 65° F. dry bulb and 65° F. wet bulb, as indicated at condition 62. As the heated exhaust air 42 mixes with the colder ambient air, the condition of the exhaust air 42 follows line 54 from condition 62 (65° F. dry bulb), to condition 64 (56° F. dry bulb), to condition 66 (46° F. dry bulb), to condition 68 (38° F. dry bulb), to condition 70 (30° F. dry bulb), and finally reaches the ambient air condition 60 (21° F. dry bulb). In this example, when the exhaust air 42 is between condition 62 and condition 70 on line 54, the air is above the saturation curve 72, as indicated, for example, at 66'. This air is supersaturated and the excess water vapor will be seen as plume. Once the exhaust air 42 of the plume 44 is fully mixed with the ambient air at condition 60, the saturation of the air is below the saturation curve 72 and the plume 44 is fully dissipated. This, however, may not occur until the plume has reached several feet to several thousands of feet away from the cooling tower.

To reduce or eliminate plumes, plume abatement measures may be implemented to force ambient air to mix with the discharged exhaust air 42, within the cooling tower and/or immediately after the exhaust air 42 has been discharged from the cooling tower. Such measures may include adjusting operation of one or more fans 30 of FIG. 1 (e.g., adjusting direction of fan blade rotation), tilting an axis of rotation of one or more fans 30 to improve mixing within the exhaust plenum 40, and/or providing additional components, as discussed in greater detail below. The plume abatement measures discussed herein may reduce the temperature and/or moisture content of the exhaust air discharged from the cooling tower such that the exhaust air discharged from the cooling tower exits at atmospheric conditions corresponding to a condition between condition 62 and condition 60 on line 54.

Figure 3:
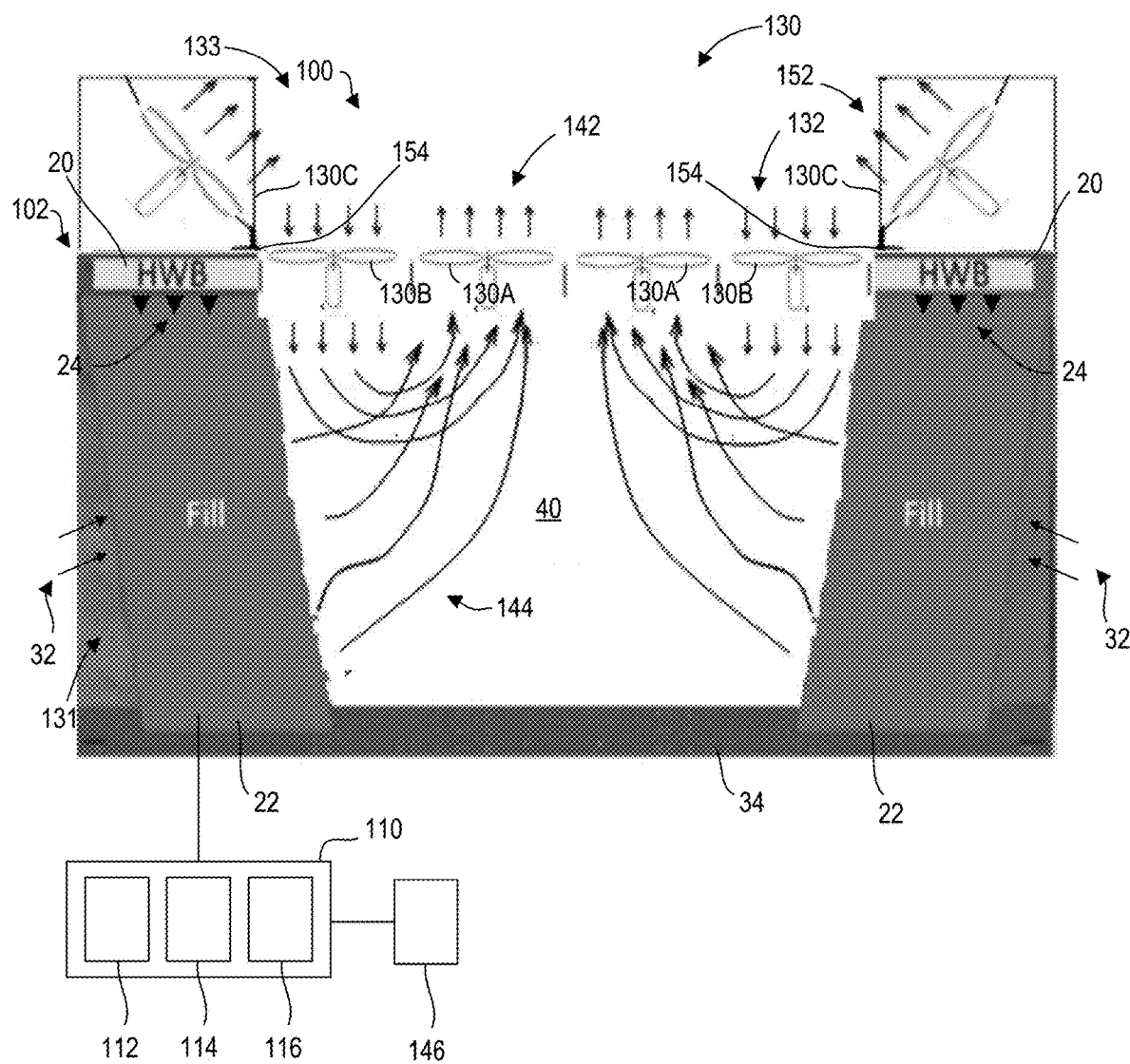
FIG. 3 is a schematic view of a second cooling tower with a plume abatement system.

Referring to FIG. 3, a cooling tower 102 including a plume abatement system 100 is provided that includes similar components as the cooling tower 12 shown in FIG. 1 wherein similar reference numerals refer to similar components. The cooling tower 12 has an evaporative heat exchanger such as fill 22 that may be disposed in an outer structure of the cooling tower 102. The cooling tower 102 also has fans 130 including primary fans, such as fans 130A, and plume abatement fans 130B, 130C. The plume abatement system 100 may include a controller 110 for controlling various components (e.g., fans, dampers, etc.) of the cooling tower 102 to cool a process fluid and abate plume. As discussed in greater detail below, when the controller 110 operates in a cooling mode, the plume abatement fans 130B may rotate in a first direction to cooperate with the fans 130A to direct air into air inlets 131 of the cooling tower 102, through the fill 22, into the interior plenum 40, and out from an air outlet 133 of the cooling tower 102. When the controller 110 operates in a plume abatement mode, the plume abatement fans 130B rotate in an opposite, second direction to direct ambient air 132 into the plenum 40 to mix with the heated air mixture 144 downstream from the fill 22 and upstream from the air outlet 133. The ambient air 132 mixes with the heated air mixture 144 in the plenum 40, which cools and reduces the moisture content of the heated air mixture 144 before the heated air mixture 144 is discharged from the air outlet 133 and reduces or eliminates plume formation.

The controller 110 may include a memory 112, a processor 114, and communication circuitry 116. The memory 112 is configured to store information, such as plume abatement instructions, predetermined setpoint temperatures or setpoint temperature ranges, and deadband temperature values (discussed in greater detail below). The processor 114 is configured to perform instructions stored in the memory 120, such as causing one or more fans to start, stop, increase speed, decrease speed, reverse direction, etc., and/or causing one or more dampers to modulate to partially or fully open or close positions. The communication circuitry 116 is configured to send and/or receive wired and/or wireless communications. For example, the communication circuitry 116 may be configured to communicate directly or indirectly with a control station for receiving instructions or sending system information.

In the approach shown, the fans 130A, 130B are provided above and across the exhaust plenum 40 of the cooling tower 102. The fans 130A, 130B may include a motor and fan blades that are driven by the motor. The blades of fans 130A, 130B may generally rotate in a common plane or may be tilted as discussed with respect to FIG. 4. The fans 130A, 130B may be direct drive fans, and the speeds of the fans 130A, 130B may be independently controlled and may be varied such that the temperature of the process fluid discharged from the cooling tower 102 is cooled to a setpoint temperature. For example, when cooling demand increases, fan speed may be increased to cause a higher airflow rate across the fill 22, thereby increasing a cooling rate at the fill 22. When cooling demand decreases, fan speed may be decreased, resulting in a lower airflow rate across the fill 22.

One or more of the fans 130A, 130B are configured to rotate in a first direction (e.g., to direct ambient air 32 through fill 22 and to direct exhaust air out from the exhaust plenum 40), and are further configured to rotate in a second, opposite direction (e.g., to direct ambient air 132 into the exhaust plenum 40). Fans that rotate in the first direction remove air from the exhaust plenum 40, which tends to decrease pressure in the exhaust plenum 40, while fans that rotate in the second direction direct air into the exhaust plenum 40 bypassing evaporative heat exchangers 22, which tends to increase pressure in the exhaust plenum 40. In one example, when ambient conditions are such that a plume will not form, as determined by the controller 110, fans 130A, 130B may be operated to run in the same direction to induce ambient air 32 to flow through fill 22, into the exhaust plenum 40, and to discharge the air as exhaust air 142 from the exhaust plenum 40. When the fans 130A, 130B are running in the same direction to discharge exhaust air out from the exhaust plenum 40, they may be controlled to operate at the same speed or at different speeds.

When ambient conditions dictate that the hot exhaust air 142 will cause a plume as determined by the control logic of the controller 110 of the cooling tower 102 or from input by a plume detector 146, and that the cooling requirement of the cooling tower 102 can be satisfied with plume abatement measures activated, one or more fans 130A, 130B may be operated to rotate in opposite directions. For example, fans 130A, which may be referred to as primary fans, may be operated in a first direction as "updraft" fans that draw ambient air 32 through the fill 22 and drive exhaust air 142 out of the exhaust plenum 40, while fans 130B, which may be referred to as plume abatement or auxiliary fans, are operated in an opposite second direction as "downdraft" fans that drive ambient air 132 from above the cooling tower 12 into the exhaust plenum 40 without directing the ambient air 132 through the fill 22. Fans 130B may be operated in the first direction as updraft fans when plume abatement is not required or not available and may be switched to operate in the second direction as downdraft fans in a plume abatement mode.

The ambient air 132 driven into the cooling tower 12 by fans 130B may have a temperature and moisture content less than the heated air mixture 144 that was drawn into the exhaust plenum 40 through the fill 22 by fans 130A. The ambient air 132 driven into the exhaust plenum 40 by fans 130B mixes with the heated air mixture 144 within the exhaust plenum 40 prior to the fans 130A driving the resulting lower temperature and lower moisture content exhaust air 142 from the cooling tower 12. In this way, the exhaust air 142 driven from the exhaust plenum 40 by fans 130A has previously been cooled by the ambient air 142 directed into the exhaust plenum 40 by the fans 130B. By cooling the air in the exhaust plenum 40, the exhaust air 142 may exit the cooling tower 102 with properties along the line 54 (see FIG. 2); that is, at or below the 100% relative humidity line 72, which reduces or eliminates plume. For example, the pre-cooled exhaust air leaves the cooling tower 102 at points 64, 66, 68, or 70 rather than at point 62. If the precooled exhaust air leaves the cooling tower 102 between points 70 and 62, plume may be observable, but to a lesser degree than if the exhaust air was at point 62. At point 70, the moisture content of the exhaust air 142 matches the maximum moisture content of the ambient air. The exhaust air 142 is not supersaturated and therefore does not cause plume.

The control logic of the controller 110 may continually determine how many fans 130A, 130B are needed to satisfy the cooling tower load and how many are available to abate plume. The controller 110 may independently control fan parameters (e.g., direction and/or speed) to optimize the abatement of plume. For example, in an alternative approach, one or more fans 130B may be operated to draw ambient air 32 through the fill 22 and to drive exhaust air 142 out of the exhaust plenum 40, while one or more fans 130A are operated to drive ambient air 132 from above the cooling tower 12 into the exhaust plenum 40.

In one approach, the cooling tower 102 includes one or more auxiliary or external fans 130C to mix additional ambient air 152 with the exhaust air 142 leaving the exhaust plenum 40. The mixing of additional ambient air 152 with the exhaust air 142 may lower the temperature and moisture content of the exhaust air 142, thereby further reducing or eliminating pluming above the cooling tower 102. The external fans 130C may be mounted adjacent to air outlet 133. For example, the external fans 130C may be disposed outside of the outer structure of the cooling tower 102 (e.g., at an upper portion or surface). The external fans 130C may include one or more attachment mechanisms that permit the external fans 130C to be moved relative to the cooling tower 102. In this way, components below the external fans 130C (such as hot water basins 20) may become accessible (e.g., for service). In one example, hinges 154 are provided to allow the external fans 130C to pivot relative to the cooling tower 102. In another example, the external fans 130C may be slidably mounted (e.g., along rails) relative to the cooling tower. External fans 130C with an associated plume abatement logic controller 110 may be added to existing evaporative heat exchanger or cooling tower applications as "retrofit" components for abating plume.

The speeds and directions of individual fans of fans 130A, 130B, and 130C may be independently controlled. As such, control logic of the controller 110 may determine the optimum usage of the fans 130A, 130B, and 130C to satisfy the cooling tower load while abating plume when desired.

Figure 4:
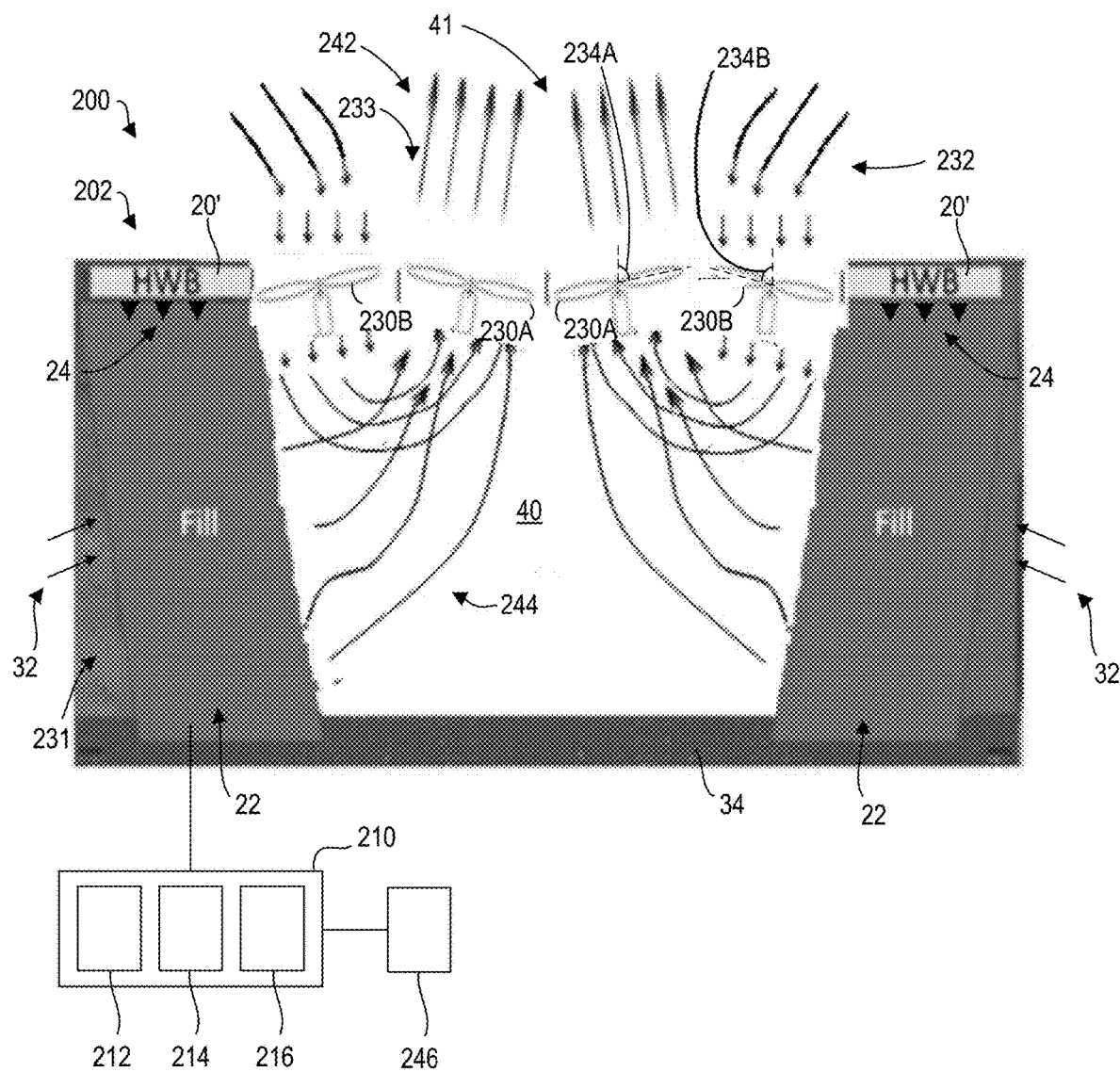
FIG. 4 is a schematic view of a third cooling tower with a plume abatement system.

Referring to FIG. 4, a cooling tower 202 including a plume abatement system 200 is provided that includes similar components as the cooling tower 12 shown in FIG. 1 wherein similar reference numerals refer to similar components. The plume abatement system 200 may include a controller 210 having a memory 212, a processor 214, and communication circuitry 216, and a plume detector 246, which may be similar to those of FIG. 3.

When the plume abatement system 200 operates the cooling tower 202 in a plume abatement mode, auxiliary or plume abatement fans such as fans 230B may be operated in a direction of rotation that is opposite that of fans 230A, which may be referred to as primary fans. In this manner, fans 230A draw ambient air 32 through air inlet 231, through the fill 22, and drive exhaust air 242 through an air outlet 233 out of the exhaust plenum 40, while fans 230B drive ambient air 232 into the exhaust plenum 40. The ambient air 232 driven into the exhaust plenum 40 by fans 230B may have a temperature and moisture content less than the heated air mixture 244 that was drawn into the exhaust plenum 40 through the fill 22 by fans 230B. The ambient air 232 driven into the exhaust plenum 40 by fans 230B mixes with and cools and reduces the moisture content of the heated air mixture 244 within the exhaust plenum 40 downstream from the fill 22 and prior to the fans 230A driving the resulting exhaust air 242 from the cooling tower 12 (e.g., upstream from air outlet 233).

In this approach, one or more of fans 230A, 230B may have an axis of rotation that is tilted or offset relative to vertical, as indicated by angles 234A, 234B, respectively. The axis of rotation of fans 230A may be oblique to the axis of rotation of fans 230B. In the example approach shown, fans 230B fans may be tilted outwardly to promote intake of ambient air 232 along paths away from the exhaust air 242, while fans 230A are tilted inwardly to direct the exhaust air 242 more vertically and away from the path of the ambient air 232. The optional tilting of the fans also helps to mix the ambient air 232 within exhaust plenum 40 before being exhausted by fans 230A.

In one embodiment, one or more external fans (e.g., external fans 130C of FIG. 3) may be provided with plume abatement system 200 to provide further plume abatement.

Figure 5:
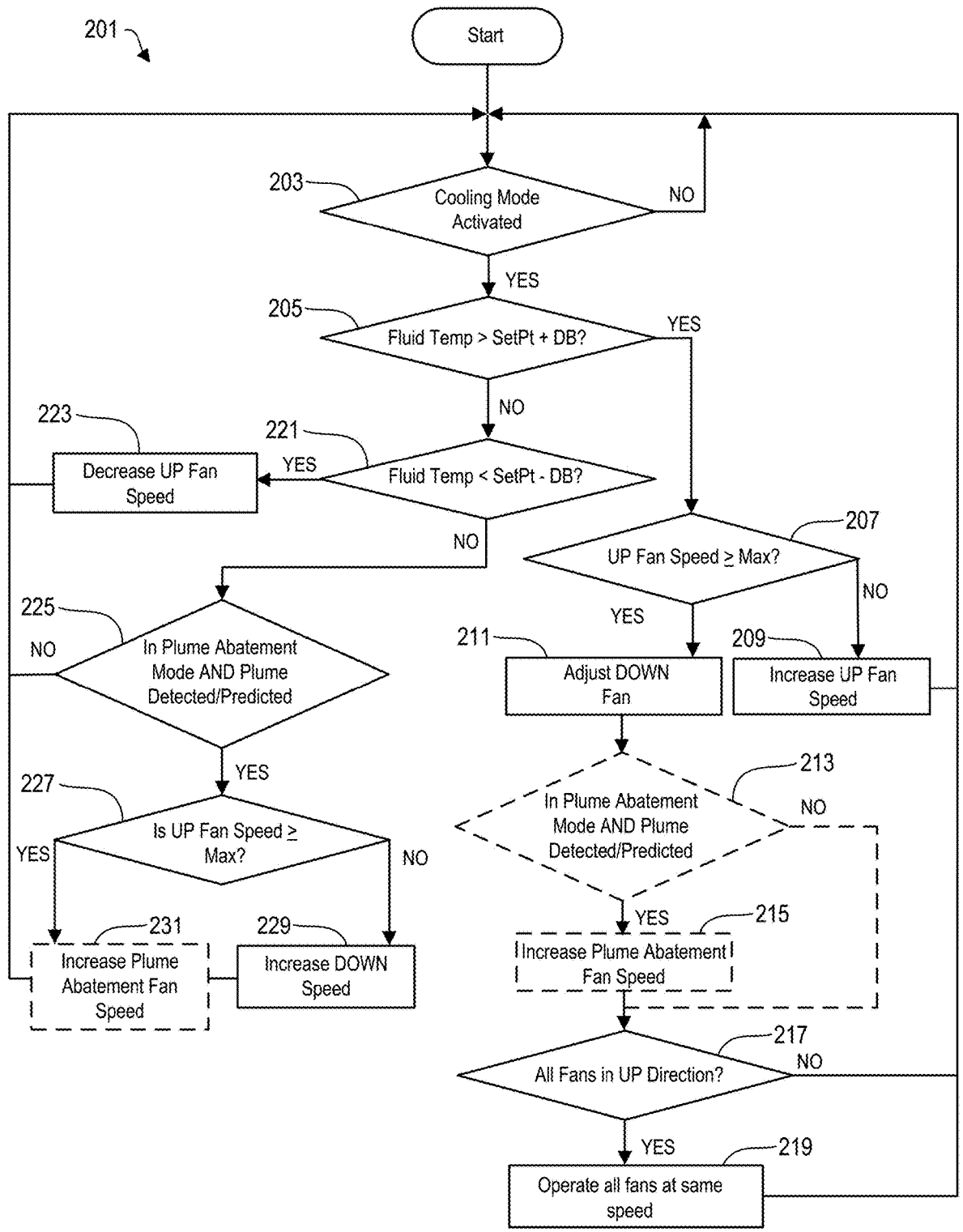
FIG. 5 shows control logic that may be used with the second and third cooling towers.

Referring to FIG. 5, a method 201 for controlling a plume abatement system for a heat rejection structure is shown. The plume abatement system may generally correspond to the plume abatement system 100 of FIG. 3 or the plume abatement system 200 of FIG. 4. The heat rejection structure may be a cooling tower, such as cooling tower 102 of FIG. 3 or cooling tower 202 of FIG. 4.

The method 201 includes determining 203 whether a cooling tower cooling mode is activated. As discussed, when the cooling tower is operating in a cooling mode, heated evaporative fluid such as water is distributed along evaporative heat exchanger fill 22, coils, and/or plates. One or more fans (e.g., fans 130A of FIG. 3 or fans 230A of FIG. 4) draw ambient air 32 through the fill 22 and drive exhaust air 242 out of the exhaust plenum 40.

When the cooling tower is operating in a cooling mode, the method 201 includes determining 205, via control logic of a controller 110, 210, whether a temperature of the heated evaporative fluid is greater than a threshold temperature or threshold temperature range. The temperature of the heated evaporative fluid may be measured prior to the heated evaporative fluid passing through an evaporative heat exchanger (e.g., fill 22). For example, the temperature may be measured within hot water basins 20 or other location upstream from the fill 22 or at the inlet or outlet of the process.

The threshold temperature range may include a predetermined setpoint temperature and a deadband temperature value. By way of example, the setpoint temperature may be 85° F. and the deadband temperature value may be 2° F. such that the threshold temperature range is 83° F. to 87° F.

When the heated evaporative fluid is greater than the threshold temperature range (e.g., the heated evaporative fluid is 90° F. in the above example), the current operation of the cooling tower may be insufficient to satisfy the cooling demand. The method 201 may therefore include determining if actions for increasing cooling capacity are available. For example, the method 201 includes determining 207 whether one or more updraft fans are operating at maximum speed. If one or more updraft fans are not operating at maximum speed, the method 201 includes increasing 209 the speed of one or more updraft fans. The method 201 then returns to operation 203 and repeats if the temperature of the heated evaporative fluid is still greater than the threshold temperature range and not all updraft fans are operating a maximum speed.

If the temperature of the heated evaporative fluid is greater than the threshold temperature range and all updraft fans are operating at a maximum speed, the method includes adjusting 211 one or more downdraft fans that are operating in a plume abatement downdraft mode by blowing ambient air into the exhaust plenum. For example, if the temperature of the heated evaporative fluid is greater than the threshold temperature range and some fans are operating in an updraft mode while others are operating in a plume abatement downdraft mode, the method 201 may include reducing the speed of the downdraft fans to reduce the amount of ambient air entering the plenum 40. If this is still not enough to maintain the proper temperature, method 201 includes changing operation of the fan(s) that were in the plume abatement downdraft mode to operate in an updraft mode to provide more airflow to be directed through the fill 22. If the cooling tower is equipped with auxiliary or external plume abatement fans (e.g., 130C of FIG. 3) located adjacent to the air outlet, and all the fans inside the cooling tower are running updraft at maximum speed (i.e., such that none of the internal fans are to be used for plume abatement) and the temperature is still above the setpoint, then the speed of the auxiliary plume fans may be adjusted to abate plume external to the cooling tower. In this case, the method 201 proceeds to increase 215 the speed of one or more external plume abatement fans.

In one embodiment, if the cooling tower includes one or more external fans such as the external fans 130C of FIG. 3, the method 201 may include determining 213 whether the cooling tower is operating in a plume abatement mode and whether plume has been detected or predicted (e.g., as determined by or informed at controller 110 or 210). If the cooling tower is operating in a plume abatement mode and plume has been detected or predicted, the method 201 includes increasing 215 the speed of one or more external fans.

As discussed, the method 201 includes adjusting 211 the speed or direction of one or more downdraft fans that are blowing ambient air into the exhaust plenum. When the direction of the downdraft fans is reversed, the method further includes determining 217 whether all fans are operating as updraft fans. When all fans are operating as updraft fans, the fans may be operated 219 at the same speed, which may be the maximum speed for each fan as set at operation 209. With all fans operating at maximum speed as updraft fans, the cooling tower is operating in maximum cooling mode.

Returning to operation 205, if the temperature of the heated evaporative fluid is not greater than the threshold temperature range, then one or more plume abatement fans (e.g., fans 130B or 230B) may be operated in a plume abatement mode. As such, the method 201 includes determining 221 whether the temperature of the heated evaporative fluid is less than the threshold temperature range. A working fluid temperature (e.g., 80° F.) that is less than the threshold temperature range (e.g., 83° F. to 87° F.) may be indicative of overcooling, and upon such a determination, the method 201 include may decreasing 223 the speed of one or more updraft fans.

When the temperature of the heated evaporative fluid is neither greater than nor less than the threshold temperature range (i.e., it is equal to a temperature of the threshold temperature range), the cooling operations of the cooling tower are achieving a desired evaporative fluid temperature. The method 201 may proceed to implement one or more plume abatement measures when directed and when necessary.

In this way, the method 201 includes determining 225 whether the cooling tower is operating in a plume abatement mode and whether plume has been detected or predicted (e.g., as determined by or informed at controller 110 or 210). Determination 225 may include determining a plume condition based at least in part on an ambient air variable (e.g., dry bulb temperature). If the cooling tower is not operating in a plume abatement mode and plume has neither been detected nor predicted, the method 201 returns to operation 203.

If the cooling tower is operating in a plume abatement mode and plume has been detected or predicted, the method 201 includes determining 227 whether one or more updraft fans are operating at maximum speed. If one or more updraft fans are not operating at maximum speed, plume abatement measures may be implemented without reducing the cooling efficiency of the updraft fans. In this way, the method 201 may include increasing 229 the fan speed of one or more downdraft fans to draw additional ambient air in the exhaust plenum of the cooling tower. Furthermore, if the cooling tower includes one or more external fans such as the external fans 130C of FIG. 3, the method 201 may include increasing 231 the speed of one or more external fans to further abate plume.

When all updraft fans are operating at maximum speed, additional ambient air in the exhaust plenum may reduce the cooling efficiency of the updraft fans. Thus, if all updraft fans are operating at maximum speed, the downdraft speeds may be held constant and the method 201 may return to operation 203. External fans, however, may still abate plume when all updraft fans are operating at maximum speed without reducing the cooling efficiency of the updraft fans. Thus, if the cooling tower includes one or more external fans such as the external fans 130C of FIG. 3, the method 201 may include increasing 231 the speed of one or more external fans to further abate plume.

Figure 6:
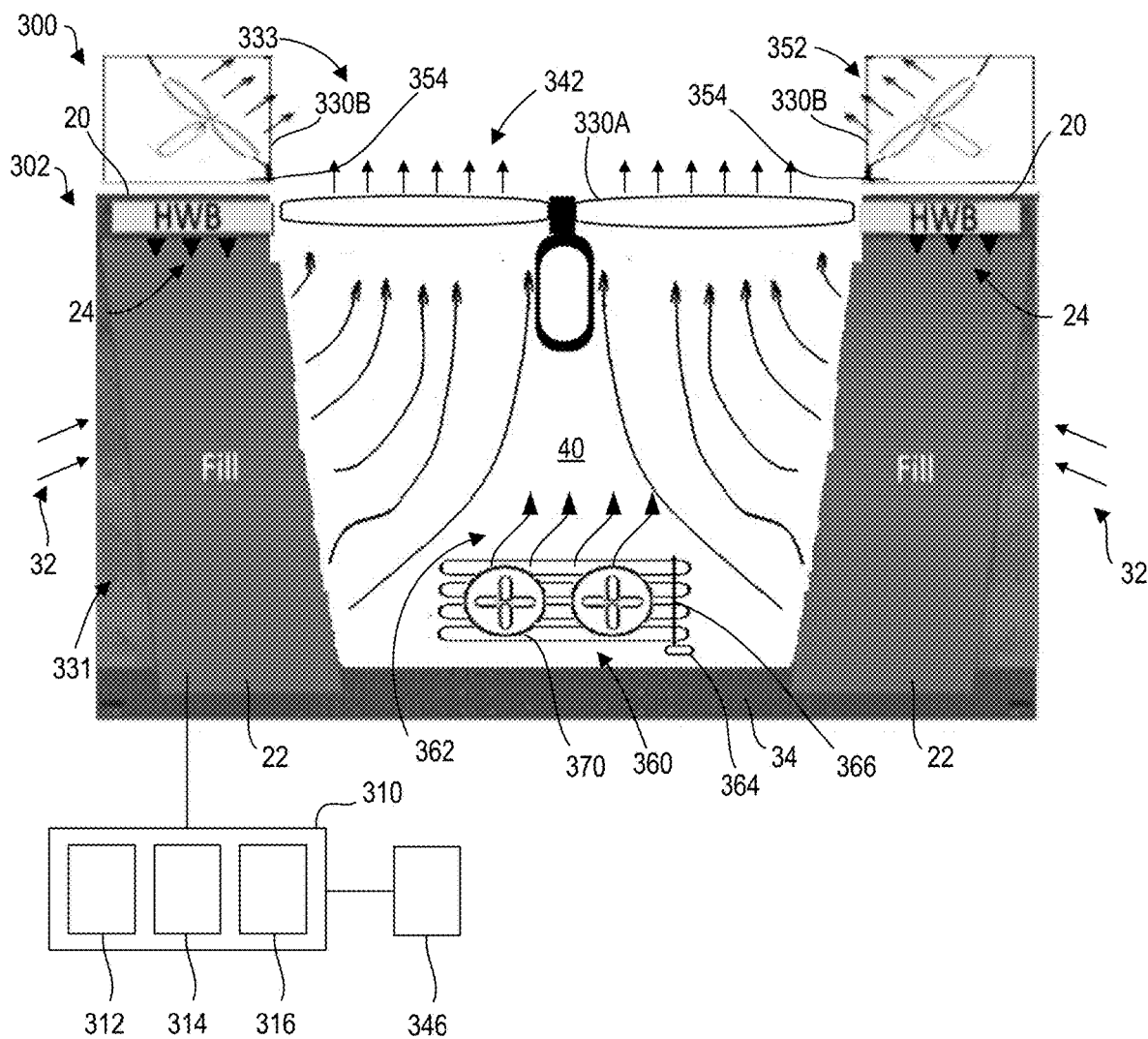
FIG. 6 is a schematic view of a fourth cooling tower with a plume abatement system.

Referring to FIG. 6, a cooling tower 302 including a plume abatement system 300 is provided that includes similar components as the cooling tower 12 shown in FIG. 1 wherein similar reference numerals refer to similar components. The plume abatement system 300 may include a controller 310 having a memory 312, a processor 314, and communication circuitry 316, and a plume detector 346, which may be similar to those of FIG. 3.

The plume abatement system 300 may include a single fan 330A, which may be referred to as a primary fan, that extends over the exhaust plenum 40. The fan 330A may be operated to draw ambient air 32 through an air inlet 331, through the fill 22 and to drive exhaust air 342 out of the exhaust plenum 40. In another approach, multiple fans (e.g., fans 30 of FIG. 1) are provided to draw ambient air 32 through the fill 22 and drive exhaust air 342 out of the exhaust plenum 40. In still another approach, one or more fans (e.g., fans 130A of FIG. 3) are provided to draw ambient air 32 through the fill 22 and drive exhaust air 342 out of the exhaust plenum 40, while one or more fans (e.g., fans 130B of FIG. 3) are provided to drive ambient air 352 into the exhaust plenum 40. One or more fans may be angled as described with respect to FIG. 4.

Similar to the cooling tower 102 of FIG. 3, cooling tower 302 of FIG. 6 may include one or more auxiliary fans such as external fans 330B for mixing additional ambient air 352 with the exhaust air 342 leaving the exhaust plenum 40. The mixing of additional ambient air 352 with the exhaust air 342 may lower the temperature and moisture content of the exhaust air 342, thereby reducing or eliminating pluming above the cooling tower 302. The external fans 330B may be movably connected to the cooling tower 302 (e.g., via hinges 354) to permit access (e.g., for service) to components of the cooling tower 302.

The cooling tower 302 may further include one or more dampers 360 that may be modulated to permit additional ambient air 362 outside of the cooling tower 302 to be drawn into the exhaust plenum 40 by fan 330A to mix with the heated air in the exhaust plenum 40 downstream from the fill 22 and upstream from air outlet 333. A damper motor 364 may be provided to adjust a position of the dampers 360 via damper linkage 366 that is connected to the dampers 360. The position of the dampers 360 (e.g., fully open, partially open, or fully closed) may be operated by the controller 310 of the cooling tower 302 to abate plume. For example, when the cooling tower 302 is satisfying cooling demand and fan 330A is running at less than 100% fan speed, the damper motor 364 may open the dampers 360 to abate plume.

One or more auxiliary plume abatement fans 370 may also be provided to add additional ambient air 362 into the exhaust plenum 40 when additional plume abatement is desired. The plume abatement fans 370 may be disposed on an external or internal sidewall of the cooling tower 302, and may be disposed to rotate about an axis transverse, such as orthogonal, to a rotational axis of fan 330A. The plume abatement fans 370 may be disposed adjacent the dampers 360 and below the fan 330A such that the plume abatement fans 370 draw the additional ambient air 362 through the dampers 360 into the exhaust plenum 40 before the fan 330A drives the mixture of the heated ambient air 32 and the additional ambient air 362 from the exhaust plenum 40. In the plume abatement mode, dampers 360 may be fully opened to abate plume and the plume abatement fans 370 may be turned on to add additional ambient air 362 into the exhaust plenum 40. The speed of the plume abatement fans 370 may also be controlled to control ambient air flow through the dampers 360.

Figure 7A:
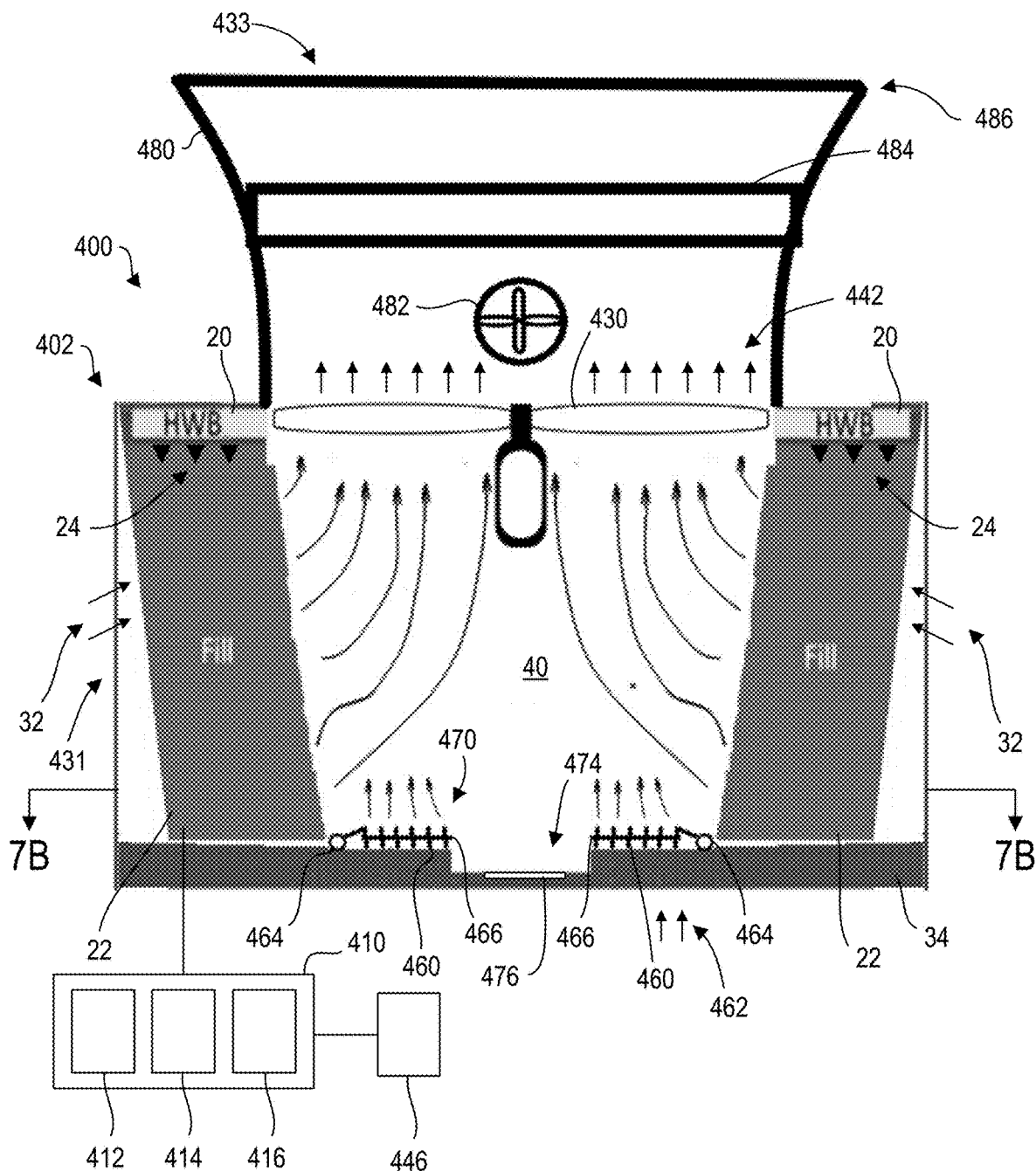
FIG. 7A is a schematic view of a fifth cooling tower having an external plume abatement chamber.

Referring to FIG. 7A, a cooling tower 402 including a plume abatement system 400 is provided that includes similar components as the cooling tower 12 shown in FIG. 1 wherein similar reference numerals refer to similar components. The plume abatement system 400 may include a controller 410 having a memory 412, a processor 414, and communication circuitry 416, and a plume detector 446, which may be similar to those of FIG. 3.

The cooling tower 402 may include a single fan 430, which may be referred to as a primary fan, that extends over the exhaust plenum 40. The fan 430 may be operated to draw ambient air 32 through an air inlet 431 and through the fill 22 and to drive exhaust air 442 through air outlet 433. out of the exhaust plenum 40. In another approach, multiple fans (e.g., fans 30 of FIG. 1) are provided to draw ambient air 32 through the fill 22 and drive exhaust air 442 out of the exhaust plenum 40. In still another approach, one or more fans (e.g., fans 130A of FIG. 3) are provided to draw ambient air 32 through the fill 22 and drive exhaust air 442 out of the exhaust plenum 40, and one or more fans (e.g., fans 130B of FIG. 3) are provided to drive ambient air 452 into the exhaust plenum 40. One or more fans may be angled as described with respect to FIG. 4.

The cooling tower 402 may further include one or more louvers or dampers 460 at the base of the cooling tower 402 that may be modulated to permit additional ambient air 462 to be drawn into the exhaust plenum by fan 430. Damper motors 464 may be provided to adjust a position of the dampers 460 via damper linkage 466. The dampers 460 may be positioned in a floor or raised portion 470 of the cold water basin 34. In this way, in addition to fan 430 drawing ambient air 32 through fill 22, the fan 430 may draw additional ambient air 462 from below the depicted portion of the cold water basin 34 to mix with the heated air downstream from the fill 22 and upstream from air outlet 441. This allows ambient air to enter the cooling tower 402 from beneath the cooling tower 402, which may be advantageous in several scenarios. For example, multi-cell cooling towers may have cooling towers that are installed side-by-side against one another such that dampers cannot be installed on the sides of the cooling tower. Dampers 460 allow ambient air to be introduced into the cooling tower 402 for plume abatement without raising the height of the cooling tower 402.

The position of the dampers 460 (e.g., fully open, partially open, or fully closed) may be adjusted by a controller 410 of the cooling tower 402 to abate plume. For example, when the cooling tower 402 satisfies cooling demand and fan 430 is running at less than 100% fan speed, the damper motor 464 may open the dampers 460 to abate plume. One or more auxiliary ambient air fans, similar to fans 370 in FIG. 6, may be provided above or below dampers 460 for additional control of the amount of ambient air entering cooling tower 402.

Figure 7B:
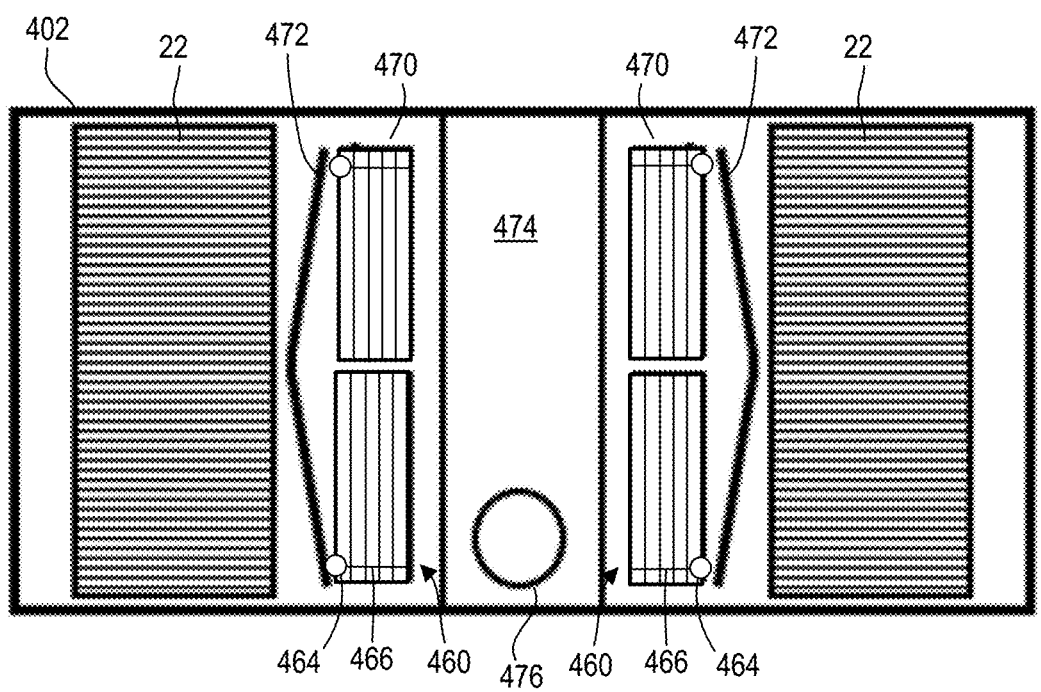
FIG. 7B is a cross-sectional view of a lower portion of the cooling tower of FIG. 7A taken across the line 7B-7B in FIG. 7A.

Referring momentarily to FIG. 7B, the raised portion 470 and dampers 460 are horizontally offset from the fill 22. In operation, cooled process water dropping from the fill 22 falls to the side of to the raised portion 470 of the cold water basin 34. The cold water basin 34 includes divider channel walls 472 that direct the water to a lower sump portion 474 of the cold water basin 34 and away from the dampers 460 before the water leaves the cooling tower 12 through a water outlet 476.

Referring again to FIG. 7A, the plume abatement system 400 may further include a mixing chamber, such as external mixing chamber 480, that is disposed above the cooling tower 12 (e.g., above the fan 430) for receiving exhaust air 442 from the exhaust plenum 40. The external mixing chamber 480 may have straight side walls or may have sloped walls as shown to act as a velocity recover stack.

The external mixing chamber 480 may include one or more auxiliary fans such as plume abatement fans 482 to introduce ambient air into the external mixing chamber 480. The plume abatement fan 482 may be disposed above the fan 430 such that the plume abatement fans 482 drive additional ambient air into the external mixing chamber 480 to mix with the mixture of the heated ambient air 32 and the additional ambient air 462 from the exhaust plenum 40 downstream from the fill 22. The speeds of fan 430 and plume abatement fan 482 may be independently controlled.

The external mixing chamber 480 may further include one or more air blender or air mixers 484 to facilitate mixing, within the external mixing chamber 480, of the additional ambient air with the exhaust air 442 received from the exhaust plenum 40. An air mixer 484 may be disposed above the plume abatement fan 482 and between the plume abatement fan 482 and an upper end portion 486 of the external mixing chamber 480 such that mixing of the exhaust air 442 and the additional ambient air introduced by plume abatement fan 482 occurs before the exhaust air 442 exits the cooling tower 12. In this way, during high load periods when dampers 460 are not opened and fan 430 is operating to satisfy the cooling tower load (e.g., operating at 100% fan speed), plume abatement fan 482 may be operated to add ambient air within external mixing chamber 480 to abate plume.

Figure 8:
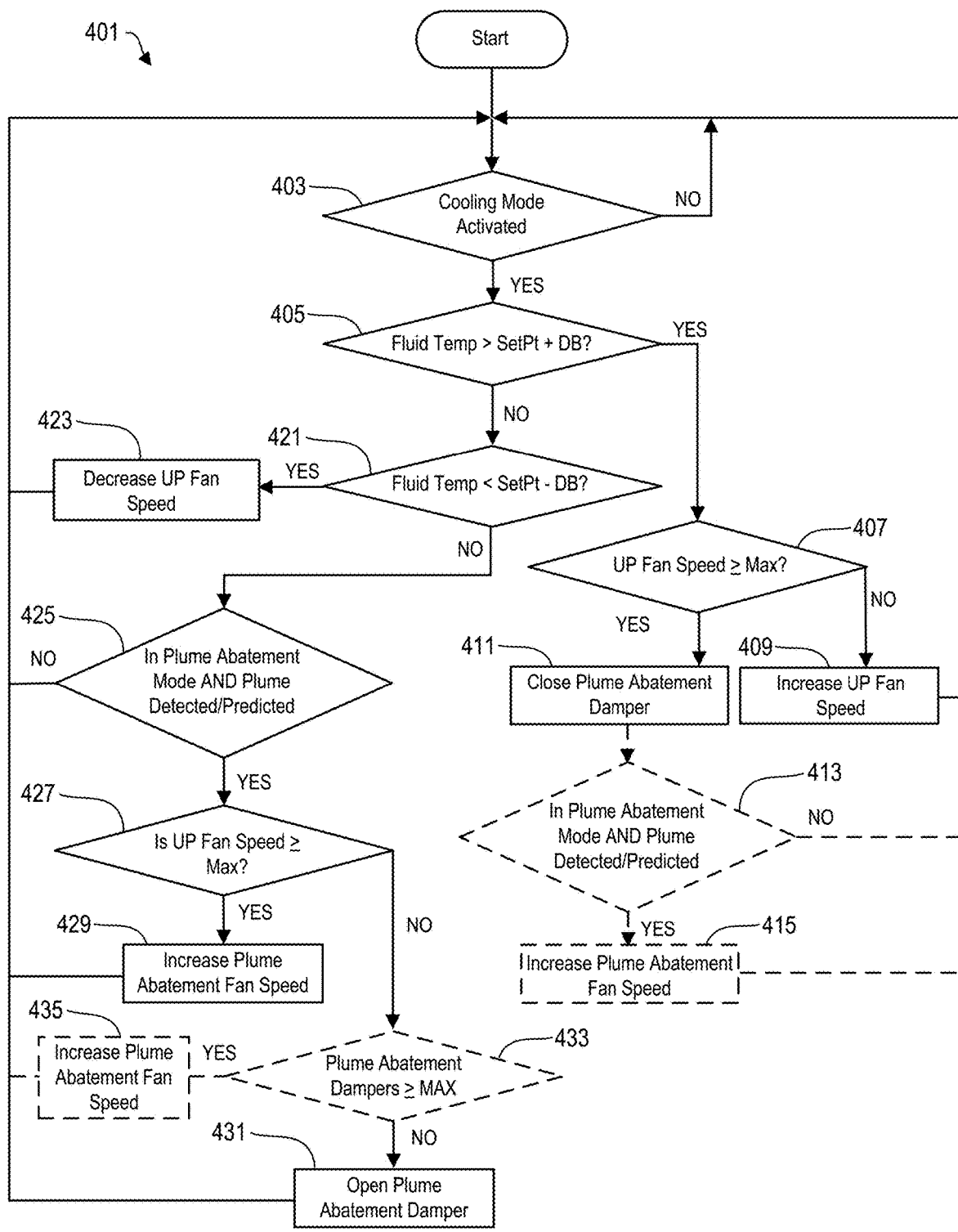
FIG. 8 shows control logic that may be used with the fourth and fifth cooling towers.

Referring to FIG. 8, another method 401 for controlling a plume abatement system for a heat rejection structure is shown. The plume abatement system may generally correspond to the plume abatement system 300 of FIG. 6 or the plume abatement system 400 of FIGS. 7A and 7B. The heat rejection structure may be a cooling tower, such as cooling tower 302 of FIG. 6 or cooling tower 402 of FIGS. 7A and 7B.

Similar to method 201 of FIG. 5, the method 401 includes determining 403 whether a cooling mode is activated for the cooling tower. When the cooling tower is operating in a cooling mode, the method 401 includes determining 405, via control logic of a controller 310, 410, whether a temperature of the heated evaporative fluid is greater than a threshold temperature or threshold temperature range. When the heated evaporative fluid is greater than the threshold temperature range, the method 401 includes determining 407 whether one or more updraft fans are operating at maximum speed. If one or more updraft fans are not operating at maximum speed, the method 401 includes increasing 409 the speed of one or more updraft fans. The method 401 then returns to operation 403 and repeats if the temperature of the heated evaporative fluid is still greater than the threshold temperature range and not all updraft fans are operating a maximum speed.

If the temperature of the heated evaporative fluid is greater than the threshold temperature and all updraft fans are operating a maximum speed, the method 401 includes closing 411 one or more ambient air dampers to a partially or fully closed position. For example, damper motor 364 of FIG. 6 may adjust a position of dampers 360 to a partially or fully closed position via damper linkage 366, or damper motor 464 of FIGS. 7A and 7B may adjust a position of dampers 460 to a partially or fully closed position via damper linkage 466. In this way, the cooling efficiency of the cooling tower may be increased by allowing less ambient air to bypass the evaporative heat exchanger.

After closing the ambient air dampers at operation 411, the method 401 may further include determining 413 whether the cooling tower is operating in a plume abatement mode and whether plume has been detected or predicted. If the cooling tower is not operating in a plume abatement mode, the method 401 returns to operation 403. If the cooling tower is operating in a plume abatement mode, the fans are operating upwards at maximum fan speed, and plume has been detected or predicted, the method 401 may include increasing 415 the speed of one or more external fans (e.g., external fans 330B of FIG. 6 or plume abatement fans 482 of FIG. 7A) to abate plume.

Returning to operation 405, if the temperature of the heated evaporative fluid is not greater than the threshold temperature range, the method 401 includes determining 421 whether the temperature of the heated evaporative fluid is less than the threshold temperature range. A fluid temperature less than the threshold temperature range may be indicative of overcooling, and upon such a determination, the method 401 may include decreasing 423 the speed of one or more updraft fans.

If the temperature of the heated evaporative fluid is not less than the threshold temperature range (i.e., it is equal to a temperature within the threshold temperature range), the method 401 includes determining 425 whether the cooling tower is operating in a plume abatement mode and whether plume has been detected or predicted. If the cooling tower is not operating in a plume abatement mode, the method 401 returns to operation 403.

When the cooling tower is operating in a plume abatement mode and plume has been detected or predicted, the method 401 includes determining 427 whether one or more updraft fans are operating at maximum speed. When all updraft fans are operating at maximum speed, additional ambient air in the exhaust plenum may reduce the cooling efficiency of the updraft fans and therefore, the dampers are kept closed or substantially closed. Elevated fans disposed higher than the updraft fan(s), however, may still abate plume when the updraft fans are operating at maximum speed without reducing the cooling efficiency of the updraft fans. Thus, if the cooling tower includes one or more elevated fans such as the external fans 130B of FIG. 6 or plume abatement fans 482 of FIG. 7A, the method 401 may include increasing 429 the speed of one or more of the elevated fans to further abate plume.

If one or more updraft fans are not operating at maximum speed, the method 401 may include implementing one or more plume abatement features such as opening 431 one or more ambient air dampers to a partially or fully open position. For example, damper motor 364 of FIG. 6 may adjust a position of dampers 360 to a partially or fully open position via damper linkage 366, or damper motor 464 of FIGS. 7A and 7B may adjust a position of dampers 460 to a partially or fully open position via damper linkage 466. In this way, additional ambient air may be drawn into the exhaust plenum by updraft fans for mixing with the saturated air that passed through the fill, thereby reducing plume at the cooling tower.

In one embodiment, prior to opening 431 one or more ambient air dampers with one or more updraft fans operating at less than maximum speed, the method 401 may include determining 433 whether ambient air dampers (e.g., dampers 360 of FIG. 6 or dampers 460 of FIGS. 7A and 7B) are fully opened. If the air dampers are fully open, the method may include increasing 435 the speed of one or more plume abatement fans (including turning one or more plume abatement fans on). The plume abatement fans may generally correspond to the plume abatement fans 370 of FIG. 6, and may be disposed adjacent the dampers 360 such that the plume abatement fans 370 drive or draw the additional ambient air 362 through the dampers 360 and into the exhaust plenum to mix with heated saturated air and abate plume.

Figure 9A:
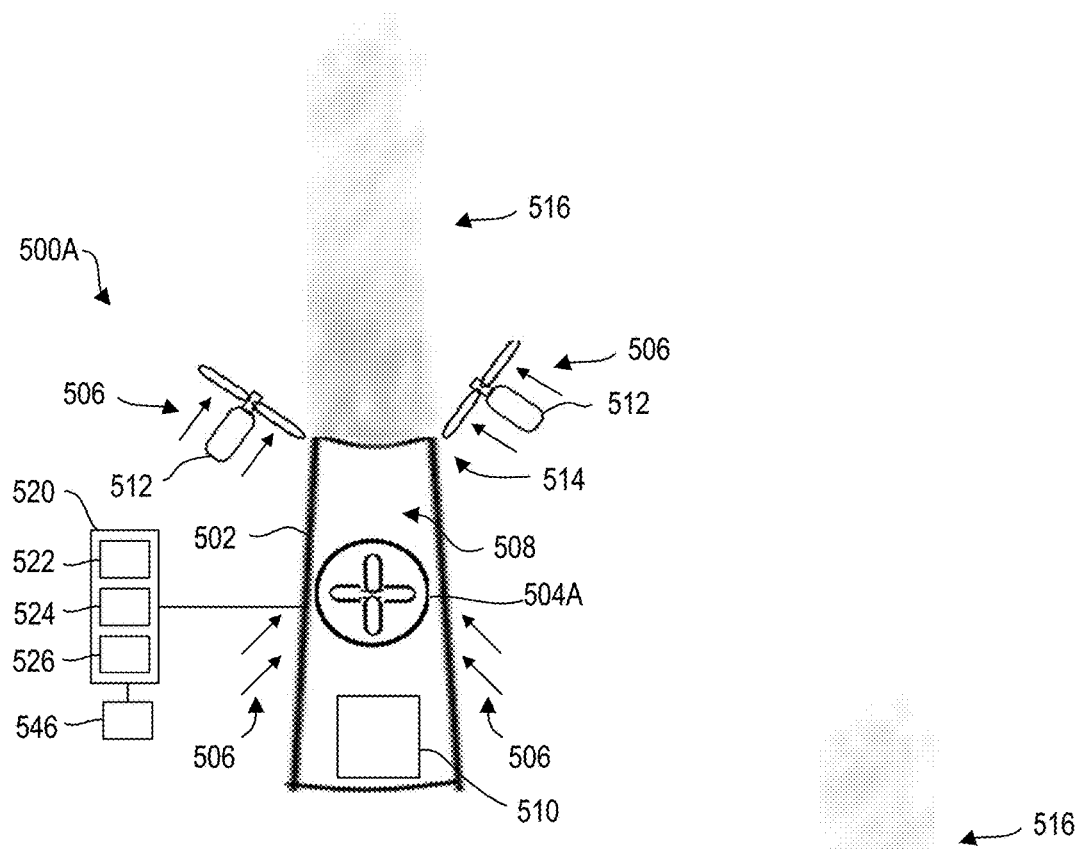
FIG. 9A is a schematic view of a first steam stack with a plume abatement system.
Figure 9B:
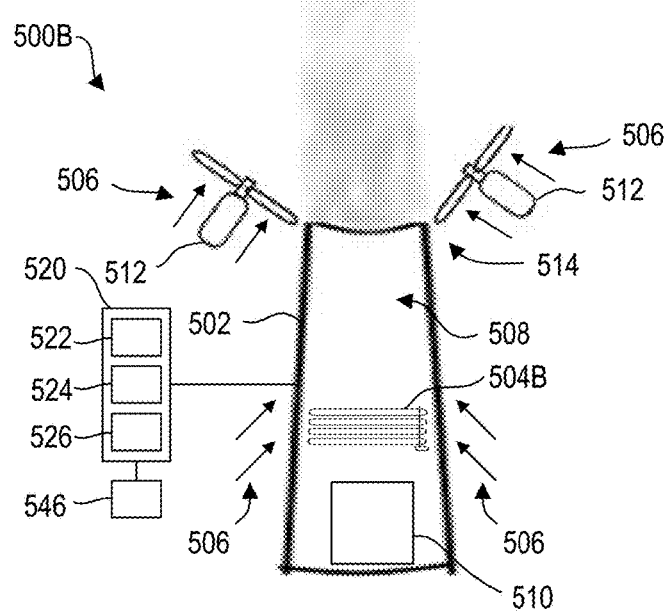
FIG. 9B is a schematic view of a second steam stack with a plume abatement system.

Referring to FIGS. 9A and 9B, a steam stack 502 is provided including plume abatement systems 500A, 500B. The steam stack 502 may receive saturated or supersaturated air (for example, from a steam turbine) at steam source 510. The plume abatement systems 500A, 500B may include one or more plume abatement features for introducing ambient air 506 into a chamber 508 of the steam stack 502. For example, the steam stack 502 of FIG. 9A includes one or more plume abatement fans 504A, and the steam stack 502 of FIG. 9B includes one or more ambient air dampers 504B where the ambient would be drawn into steam stack 502 by a venturi effect. The plume abatement fan 504A may be configured to operate in a manner similar to those described with respect to plume abatement fan 370 discussed with respect to FIG. 6 and/or plume abatement fan 482 discussed with respect to FIG. 7A. The ambient air damper 504B may be configured to operate in a manner similar to those described with respect to ambient air damper 360 discussed with respect to FIG. 6. In another approach, a steam stack may include both plume abatement fans and ambient air dampers, similar to the cooling tower 302 discussed with respect to FIG. 6.

The plume abatement systems 500A, 500B may further include one or more auxiliary fans such as external fans 512. The external fans 512 may be configured to operate in a manner similar to those described with respect to external fans 130C discussed with respect to FIG. 3 and/or external fans 330B discussed with respect to FIG. 6. In this way, external fans 512 may mix ambient air 506 just outside of a discharge region 514 of the steam stack 502 to further abate plume 516. The external fans 512 may be installed with new steam stacks 502, or may be retrofit to existing steam stacks 502.

The plume abatement systems 500A, 500B may include a controller 520 having a memory 522, a processor 524, and communication circuitry 526, and a plume detector 546, which may be similar to those of FIG. 3.

In still another approach, a plume abatement system similar to plume abatement system 400 of FIG. 7A may be provided at the top of the steam stack 502. For example, a mixing chamber similar to the external mixing chamber 480 may be disposed above the steam stack 502 for receiving exhaust air from the exhaust plenum at the top of the steam stack. The external mixing chamber may have straight side walls or may have sloped walls to operate as a velocity recover stack. The external mixing chamber may include one or more auxiliary fans similar to the plume abatement fans 482 (in addition to or in lieu of fans 512) to introduce ambient air into the external mixing chamber without significantly affecting the operation of the steam stack. An air mixer similar to the air mixer 484 may also be included to blend the steam exhaust and the fresh ambient air before releasing the mixed steam and ambient air to the environment to abate or eliminate plume.

Figure 10:
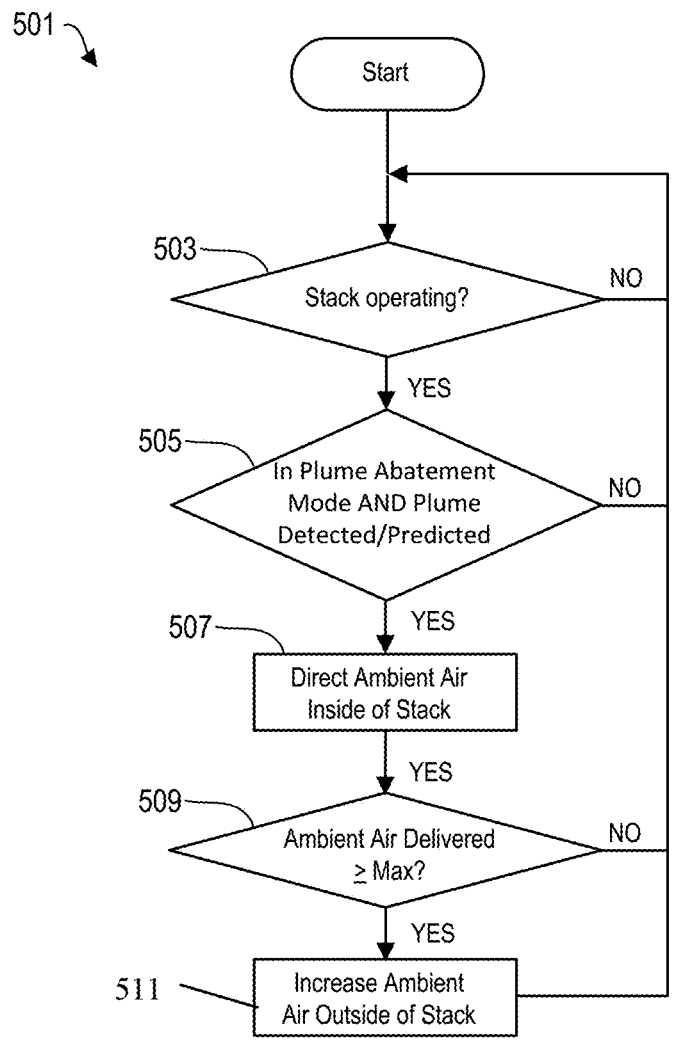
FIG. 10 shows control logic that may be used with the first and second steam stacks.

Referring to FIG. 10, another method 501 for controlling a plume abatement system for a heat rejection structure is shown. The plume abatement system may generally correspond to the plume abatement systems 500A, 500B of FIGS. 9A and 9B. The heat rejection structure may be a steam stack, such as steam stack 502 of FIGS. 9A and 9B.

Similar to method 201 of FIG. 5, the method 501 includes determining 503 whether the steam stack is operating. When the steam stack is operating, saturated or supersaturated air may be discharged from the steam stack causing plume during certain ambient conditions. When the steam stack is operating, the method 501 includes determining 505 whether the steam stack is operating in a plume abatement mode and whether plume has been detected or predicted (e.g., as determined by or informed at controller 520). If the steam stack is operating in a plume abatement mode and plume has been detected or predicted, the method includes providing 507 ambient air inside the steam stack to abate plume. For example, plume abatement fans 504A and/or ambient air dampers 504B may be operated to provide ambient air into the plenum inside of the steam stack.

The method may further include determining 509 whether the plume abatement devices are providing a maximum volume of ambient air to the inside of the steam stack. For example, if plume abatement fans 504A are operating at maximum speed, the plume abatement fans 504A are providing the maximum volume of ambient air. Similarly, if ambient air dampers 504B are fully open, the ambient air dampers 504B are providing the maximum volume of ambient air. If the plume abatement devices are not providing a maximum volume of ambient air, the method 501 may restart until the plume abatement devices are providing a maximum volume of ambient air at operation 507. If the plume abatement devices are providing a maximum volume of ambient air inside the steam stack and there is still plume, the method 501 includes increasing 511 the volume of ambient air delivered to plume 516 at an exterior of the steam stack. For example, the speed of one or more external fans 512 of FIGS. 9A and 9B may be increased to mix ambient air 506 immediately after the exhaust air has been discharged to a discharge region 514 of the steam stack 502 to further abate plume. If there is no provision to add ambient air to the inside of the steam stack by either dampers and/or fans (e.g., when the internal pressure of the steam inside the steam stack is too high), the method 501 may control the on/off state and/or speed of fans 512 of FIGS. 9A and 9B.

Figure 11:
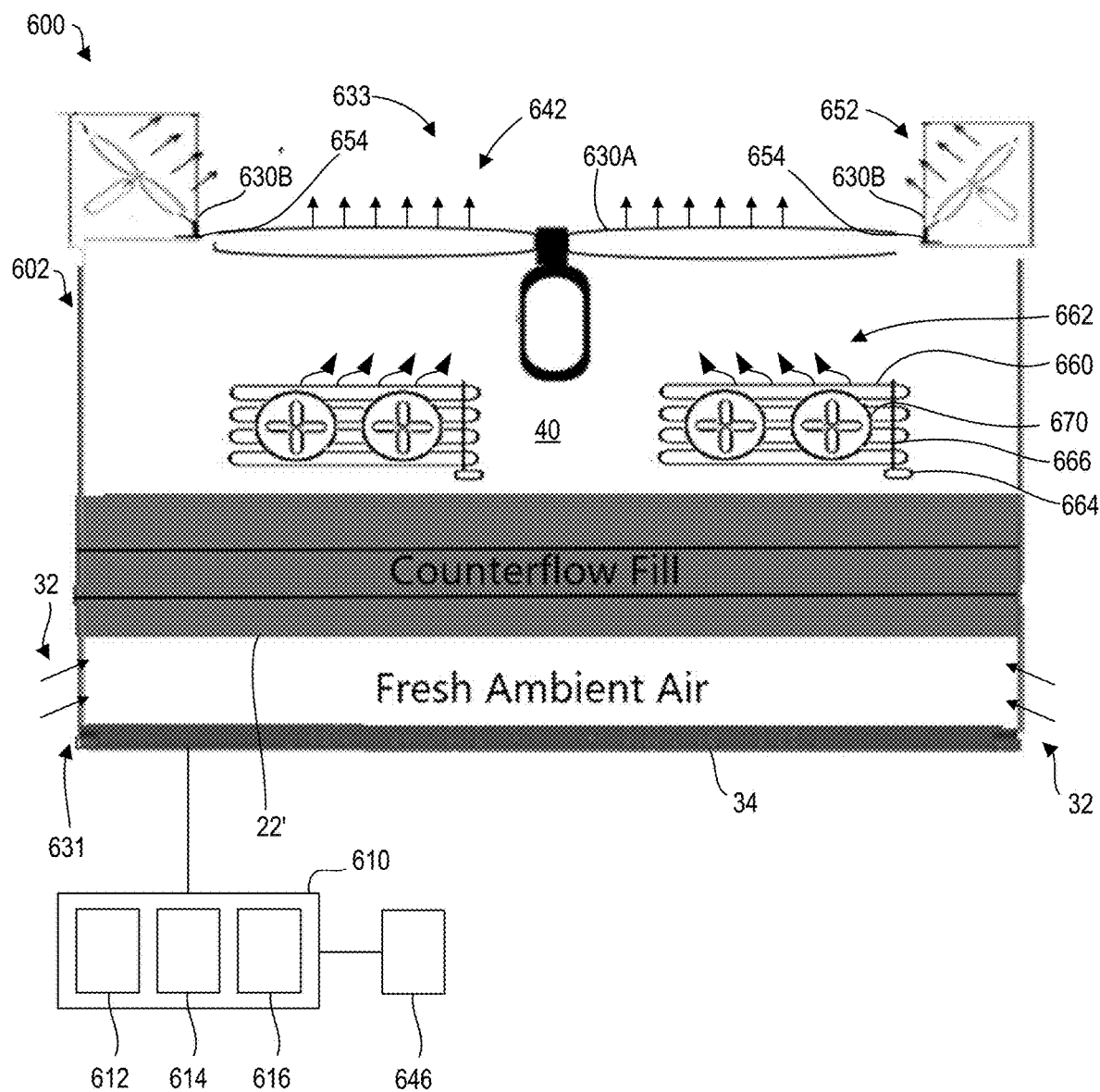
FIG. 11 is a schematic view of a sixth cooling tower with a plume abatement system.

Referring to FIG. 11, a cooling tower 602 including a plume abatement system 600 is provided that includes similar components as the cooling tower 12 shown in FIG. 1 wherein similar reference numerals refer to similar components. The plume abatement system 600 may include a controller 610 having a memory 612, a processor 614, and communication circuitry 616, and a plume detector 646, which may be similar to those of FIG. 3.

The plume abatement system 600 may include a single fan 630A, which may be referred to as a primary fan, that extends over the exhaust plenum 40. The fan 630A may be operated to draw ambient air 32 through an air inlet 631, direct the ambient air 32 through a counterflow fill 22', and to drive exhaust air 642 out of the exhaust plenum 40. In another approach, multiple fans (e.g., fans 30 of FIG. 1) are provided to draw ambient air 32 through the counterflow fill 22' and drive exhaust air 642 out of the exhaust plenum 40.

Similar to the cooling tower 102 of FIG. 3, the cooling tower 602 of FIG. 11 may include one or more auxiliary fans such as external fans 630B for mixing additional ambient air 652 with the exhaust air 642 leaving the exhaust plenum 40. The mixing of additional ambient air 652 with the exhaust air 642 may lower the temperature and moisture content of the exhaust air 642, thereby reducing or eliminating pluming above the cooling tower 602. The external fans 630B may be movably connected to the cooling tower 602 (e.g., via hinges 654) to permit access (e.g., for service) to components of the cooling tower 602.

The cooling tower 602 may further include one or more dampers 660 that may be modulated to permit additional ambient air 662 outside of the cooling tower 602 to be drawn into the exhaust plenum 40 by fan 630A to mix with the heated air in the exhaust plenum 40 downstream from the counterflow fill 22' and upstream from air outlet 633. A damper motor 664 may be provided to adjust a position of the dampers 660 via damper linkage 666 that is connected to the dampers 660. The position of the dampers 660 (e.g., fully open, partially open, or fully closed) may be operated by the controller 610 of the cooling tower 602 to abate plume. For example, when the cooling tower 602 is satisfying cooling demand and fan 630A is running at less than 100% fan speed, the damper motor 664 may open the dampers 660 to abate plume.

One or more auxiliary plume abatement fans 670 may also be provided to add additional ambient air 662 into the exhaust plenum 40 when additional plume abatement is desired. The plume abatement fans 670 may be disposed on an external or internal sidewall of the cooling tower 602, and may be disposed to rotate about an axis transverse, such as orthogonal, to a rotational axis of fan 630A. The plume abatement fans 670 may be disposed adjacent the dampers 660 and below the fan 630A such that the plume abatement fans 670 draw the additional ambient air 662 through the dampers 660 into the exhaust plenum 40 before the fan 630A drives the mixture of the heated ambient air 32 and the additional ambient air 662 from the exhaust plenum 40. In the plume abatement mode, dampers 660 may be fully opened to abate plume and the plume abatement fans 670 may be turned on to add additional ambient air 662 into the exhaust plenum 40. The speed of the plume abatement fans 670 may also be controlled to control ambient air flow through the dampers 660.

Figure 12:
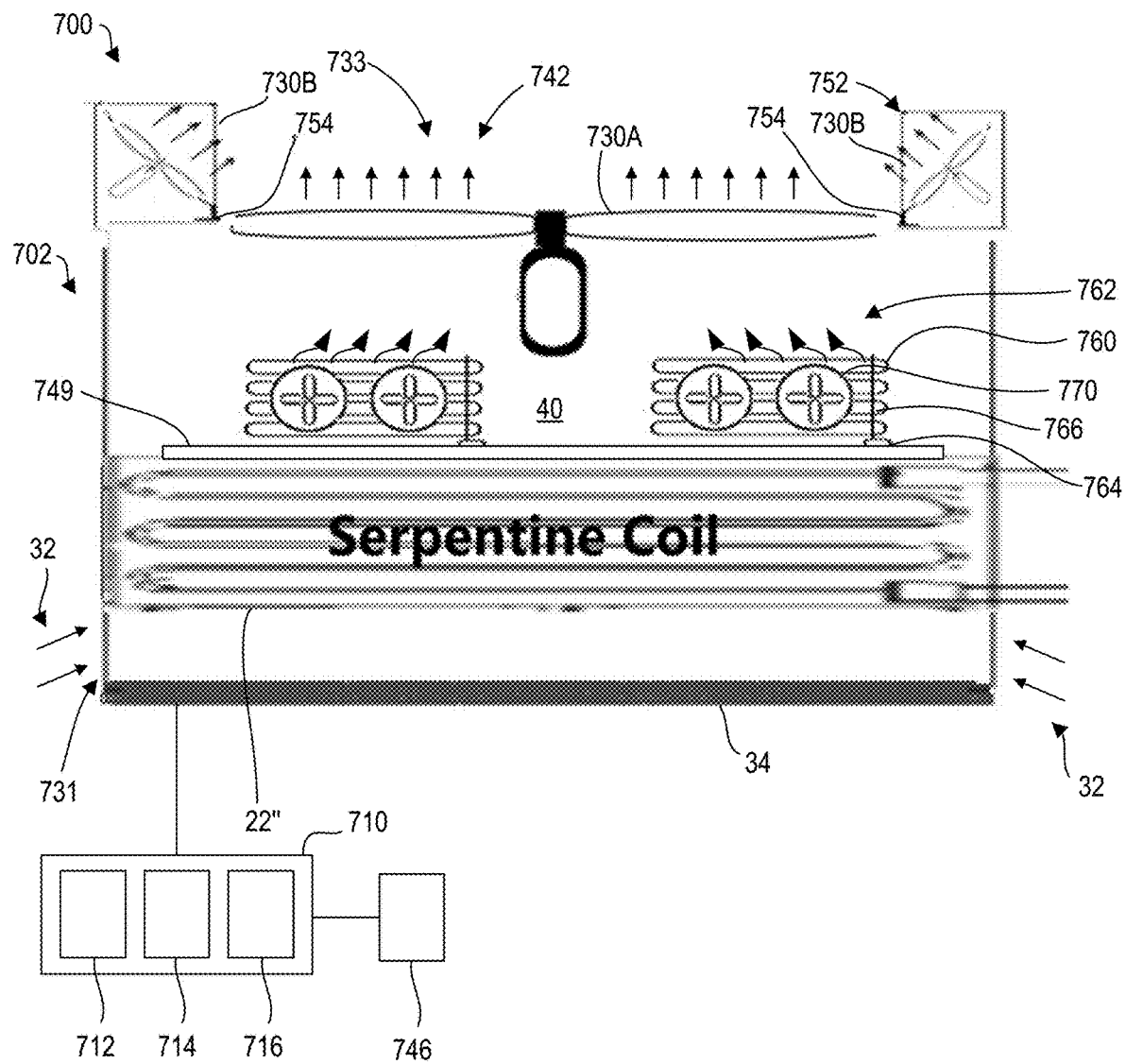
FIG. 12 is a schematic view of a seventh cooling tower with a plume abatement system.

Referring to FIG. 12, a cooling tower 702 including a plume abatement system 700 is provided that includes similar components as the cooling tower 12 shown in FIG. 1 wherein similar reference numerals refer to similar components. The plume abatement system 700 may include a controller 710 having a memory 712, a processor 714, communication circuitry 716, and a plume detector 746, which may be similar to those of FIG. 3.

The plume abatement system 700 may include a single fan 730A, which may be referred to as a primary fan, that extends over the exhaust plenum 40. The fan 730A may be operated to draw ambient air 32 through an air inlet 731.

In the cooling tower 702 of FIG. 12, the evaporative heat exchanger includes serpentine coils 22" that carry working fluid therethrough and an evaporative liquid distribution system 749 for distributing evaporative liquid onto the exteriors of the serpentine coils 22". The evaporative liquid absorbs heat from the working fluid through sidewalls of the serpentine coils 22". Some of the evaporative liquid evaporates into water vapor and the remaining evaporative liquid is collected in a sump and recirculated back into the evaporative liquid distribution system 749.

Similar to the cooling tower 102 of FIG. 3, the cooling tower 702 of FIG. 12 may include one or more auxiliary fans such as external fans 730B for mixing additional ambient air 752 with the exhaust air 742 leaving the exhaust plenum 40. The mixing of additional ambient air 752 with the exhaust air 742 may lower the temperature and moisture content of the exhaust air 742, thereby reducing or eliminating pluming above the cooling tower 702. The external fans 730B may be movably connected to the cooling tower 702 (e.g., via hinges 754) to permit access (e.g., for service) to components of the cooling tower 702.

The cooling tower 702 may further include one or more dampers 760 that may be modulated to permit additional ambient air 762 outside of the cooling tower 702 to be drawn into the exhaust plenum 40 by fan 730A to mix with the heated air in the exhaust plenum 40 downstream from the serpentine coils 22" and upstream from air outlet 733. A damper motor 764 may be provided to adjust a position of the dampers 760 via damper linkage 766 that is connected to the dampers 760. The position of the dampers 760 (e.g., fully open, partially open, or closed) may be operated by the controller 710 of the cooling tower 702 to abate plume. For example, when the cooling tower 702 is satisfying cooling demand and fan 730A is running at less than 100% fan speed, the damper motor 764 may open the dampers 760 to abate plume.

One or more auxiliary plume abatement fans 770 may also be provided to add additional ambient air 762 into the exhaust plenum 40 when additional plume abatement is desired. The plume abatement fans 770 may be disposed on an external or internal sidewall of the cooling tower 12 and may be configured to rotate about an axis transverse, such as orthogonal, to a rotational axis of fan 730A. The plume abatement fans 770 may be disposed adjacent the dampers 760 and below the fan 730A such that the plume abatement fans 770 draw the additional ambient air 762 through the dampers 760 into the exhaust plenum 40 before the fan 730A drives the mixture of the heated ambient air 32 and the additional ambient air 762 from the exhaust plenum 40. In the plume abatement mode, dampers 760 may be fully opened to abate plume and the plume abatement fans 770 may be turned on to add additional ambient air 762 into the exhaust plenum 40. The speed of the plume abatement fans 770 may also be controlled to control ambient air flow through the dampers 760.

Although method steps may be presented and described herein in a sequential fashion, one or more of the steps shown and described may be omitted, repeated, performed concurrently, and/or performed in a different order than the order shown in the figures and/or described herein. It will be appreciated that computer-readable instructions for facilitating the methods described above may be stored in various non-transitory computer readable mediums as is known in the art. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A heat rejection apparatus comprising:
an air inlet;
an air outlet;
an evaporative heat exchanger;
a primary fan operable to direct first ambient air into the air inlet, cause the first ambient air to interact with the evaporative heat exchanger to produce heated air, and discharge the heated air from the air outlet;
a plume abatement fan operable to direct second ambient air into contact with the heated air downstream of the evaporative heat exchanger;
a controller operably coupled to the primary fan and the plume abatement fan, the controller having a plume abatement mode wherein the controller operates the plume abatement fan to cause the plume abatement fan to direct the second ambient air into contact with the heated air to cool the heated air and abate plume;
wherein the controller has a cooling mode wherein the controller operates the plume abatement fan in a first direction to assist in directing the first ambient air into the air inlet, causing the first ambient air to interact with the evaporative heat exchanger, and discharging the heated air from the air outlet; and
wherein the controller plume abatement mode includes the controller operating the plume abatement fan in an opposite, second direction to direct the second ambient air into contact with the heated air downstream of the evaporative heat exchanger.

2. The heat rejection apparatus of claim 1, wherein the plume abatement fan is operable to direct the second ambient air into contact with the heated air downstream of the evaporative heat exchanger and upstream of the air outlet.

3. The heat rejection apparatus of claim 1, further comprising a plenum intermediate the evaporative heat exchanger and the air outlet; and
wherein the plume abatement fan is operable to direct the second ambient air into contact with the heated air in the plenum.

4. The heat rejection apparatus of claim 1, further comprising an external plume abatement fan operable to direct third ambient air into contact with the heated air downstream of the air outlet.

5. The heat rejection apparatus of claim 4 further comprising an outer structure, the evaporative heat exchanger in the outer structure, the air inlet permitting ambient airflow into an interior of the outer structure, and the air outlet permitting heated air to exit the interior of the outer structure; and
wherein the external plume abatement fan is outside of the outer structure, the plume abatement fan operable to direct the third ambient air into contact with the heated air once the heated air has been discharged from the air outlet.

6. The heat rejection apparatus of claim 1 wherein the primary fan is operable to cause the heated air to discharge from the air outlet in a first direction; and
wherein the plume abatement fan is operable to direct the second ambient air in a second direction transverse to the first direction into contact with the heated air.

7. The heat rejection apparatus of claim 6 further comprising a plenum intermediate the evaporative heat exchanger and the air outlet;
wherein the primary fan is operable to cause the heated air in the plenum to discharge from the air outlet in the first direction; and
wherein the plume abatement fan is operable to direct the second ambient air in the second direction oblique to the first direction into contact with the heated air in the plenum.

8. The heat rejection apparatus of claim 1 wherein the evaporative heat exchanger includes heat transfer elements, a liquid distribution system configured to distribute a liquid comprising water onto the heat transfer elements, and a sump to collect liquid.

9. A heat rejection apparatus comprising:
an air inlet;
an air outlet;
an evaporative heat exchanger;
a primary fan operable to direct first ambient air into the air inlet, cause the first ambient air to interact with the evaporative heat exchanger to produce heated air, and discharge the heated air from the air outlet;
a plume abatement fan operable to direct second ambient air into contact with the heated air downstream of the evaporative heat exchanger; and
a controller operably coupled to the primary fan and the plume abatement fan, the controller having a plume abatement mode wherein the controller operates the plume abatement fan to cause the plume abatement fan to direct the second ambient air into contact with the heated air to cool the heated air and abate plume;
wherein the primary fan comprises a plurality of primary fans and the plume abatement fan includes a plurality of plume abatement fans;
wherein the controller has a cooling mode wherein the controller operates the primary fans and the plume abatement fans in first directions so that both the primary fans and the plume abatement fans cooperate to direct the first ambient air into the air inlet, cause the first ambient air to interact with the evaporative heat exchanger, and discharge the heated air from the air outlet; and
wherein the plume abatement mode of the controller includes the controller:
operating the primary fans in the first directions; and
operating the plume abatement fans in second directions opposite the first directions of the plume abatement fans so that the plume abatement fans direct the second ambient air into contact with the heated air downstream of the evaporative heat exchanger.

10. The heat rejection apparatus of claim 9, wherein the plume abatement fans are operable to direct the second ambient air into contact with the heated air downstream of the evaporative heat exchanger and upstream of the air outlet.

11. The heat rejection apparatus of claim 9, further comprising a plenum intermediate the evaporative heat exchanger and the air outlet; and
wherein the plume abatement fans are operable to direct the second ambient air into contact with the heated air in the plenum.

12. The heat rejection apparatus of claim 9 wherein the primary fans are operable to cause the heated air to discharge from the air outlet in first directions; and
wherein the plume abatement fans are operable to direct the second ambient air in second directions transverse to the first directions into contact with the heated air.

13. The heat rejection apparatus of claim 12 further comprising a plenum intermediate the evaporative heat exchanger and the air outlet;
wherein the primary fans are operable to cause the heated air in the plenum to discharge from the air outlet in the first directions; and
wherein the plume abatement fans are operable to direct the second ambient air in the second directions oblique to the first direction and into contact with the heated air in the plenum.

14. The heat rejection apparatus of claim 9 wherein the evaporative heat exchanger includes heat transfer elements, a liquid distribution system configured to distribute a liquid comprising water onto the heat transfer elements, and a sump to collect liquid.

15. A method of operating a heat rejection apparatus, the method comprising:
receiving a setpoint temperature for a process fluid discharged from the heat rejection apparatus;
operating a primary fan to direct first ambient air into an air inlet of the heat rejection apparatus, causing the first ambient air to interact with an evaporative heat exchanger to cool the process fluid and produce heated air, and discharging the heated air from an air outlet of the heat rejection apparatus;

detecting, via a sensor of the heat rejection apparatus, an ambient air variable;

determining a plume formation condition based at least in part on the ambient air variable;

determining, via a controller of the heat rejection apparatus, a cooling demand for the heat rejection apparatus based at least in part upon the setpoint temperature;

determining, via a controller of the heat rejection apparatus, whether the heat rejection apparatus is able to satisfy the cooling demand while performing plume abatement;

operating a plume abatement fan to direct second ambient air into contact with the heated air to cool the heated air and abate plume in response to determining the plume formation condition and determining the heat rejection apparatus is able to satisfy the cooling demand while performing plume abatement; and operating the plume abatement fan to direct less of the second ambient air into contact with the heated air in response to determining the plume formation condition and determining the heat rejection apparatus is unable to satisfy the cooling demand while performing plume abatement.

16. The method of claim 15 wherein operating the plume abatement fan to direct second ambient air into contact with the heated air includes directing the second ambient air into contact with the heated air downstream of the evaporative heat exchanger and upstream of the air outlet of the heat rejection apparatus.

17. The method of claim 15 wherein operating the plume abatement fan to direct second ambient air into contact with the heated air includes directing the second ambient air into contact with the heated air in a plenum of the heat rejection apparatus upstream of the air outlet of the heat rejection apparatus.

18. The method of claim 15 further comprising operating an external plume abatement fan including directing the second ambient air into contact with the heated air downstream of the air outlet after the heated air has been rejected from the heat rejection apparatus.

19. The method of claim 15 wherein the heat rejection apparatus includes an outer structure comprising the air inlet and the air outlet, the evaporative heat exchanger being in the outer structure;

wherein operating the primary fan includes directing the first ambient air through the air inlet and into an interior of the outer structure, causing the first ambient air to interact with the evaporative heat exchanger to produce the heated air in the interior of the outer structure, and discharging the heated air from the air outlet; and operating an external plume abatement fan including directing the second ambient air into contact with the heated air after the heated air has been discharged from the air outlet of the outer structure.

20. The method of claim 15 wherein operating the primary fan includes discharging the heated air from the air outlet in a first direction; and wherein operating the plume abatement fan to direct second ambient air into contact with the heated air includes directing the second ambient air in a second direction transverse to the first direction into contact with the heated air.

21. The method of claim 15 wherein the heat rejection apparatus includes a plenum intermediate the evaporative heat exchanger and the air outlet;

wherein operating the primary fan includes discharging the heated air from the air outlet in a first direction; and wherein operating the plume abatement fan to direct second ambient air into contact with the heated air includes directing the second ambient air in a second direction oblique to the first direction into contact with the heated air in the plenum.

22. The method of claim 15 further comprising distributing a liquid comprising water onto a heat transfer element of the evaporative heat exchanger; and collecting the liquid in a sump.

23. The method of claim 15 wherein operating the plume abatement fan to direct second ambient air into contact with the heated air includes operating the plume abatement fan in a first direction; and wherein operating the plume abatement fan to direct less of the second ambient air into contact with the heated air comprises:

slowing rotation of the plume abatement fan in the first direction; and/or rotating the plume abatement fan in a second direction opposite the first direction.

24. A method of operating a heat rejection apparatus, the method comprising operating a primary fan to direct first ambient air into an air inlet of the heat rejection apparatus, causing the first ambient air to interact with an evaporative heat exchanger to produce heated air, and discharging the heated air from an air outlet of the heat rejection apparatus;

determining a plume formation condition based at least in part on an ambient air variable;

operating a plume abatement fan to direct second ambient air into contact with the heated air to cool the heated air and abate plume in response to determining the plume formation condition;

operating the plume abatement fan in a first direction to assist in directing the first ambient air into the air inlet, causing the first ambient air to interact with the evaporative heat exchanger to produce heated air, and discharging the heated air from the air outlet; and wherein operating the plume abatement fan to direct second ambient air into contact with the heated air comprises operating the plume abatement fan in an opposite, second direction to direct the second ambient air into contact with the heated air.

25. The method of claim 24 wherein operating the plume abatement fan to direct second ambient air into contact with the heated air includes directing the second ambient air into contact with the heated air downstream of the evaporative heat exchanger and upstream of the air outlet of the heat rejection apparatus.

26. The method of claim 24 wherein operating the plume abatement fan to direct second ambient air into contact with the heated air includes directing the second ambient air into contact with the heated air in a plenum of the heat rejection apparatus upstream of the air outlet of the heat rejection apparatus.

27. The method of claim 24 wherein operating the primary fan includes discharging the heated air from the air outlet in a first direction; and wherein operating the plume abatement fan to direct second ambient air into contact with the heated air includes directing the second ambient air in a second direction transverse to the first direction into contact with the heated air.

28. The method of claim 24 wherein the heat rejection apparatus includes a plenum intermediate the evaporative heat exchanger and the air outlet;
wherein operating the primary fan includes discharging the heated air from the air outlet in a first direction; and
wherein operating the plume abatement fan to direct second ambient air into contact with the heated air includes directing the second ambient air in a second direction oblique to the first direction into contact with the heated air in the plenum.

29. The method of claim 24 further comprising distributing a liquid comprising water onto a heat transfer element of the evaporative heat exchanger; and
collecting the liquid in a sump.

30. A plume abatement system for a heat rejection apparatus having an evaporative heat exchanger and a primary fan operable to generate airflow relative to the evaporative heat exchanger and produce heated air, the heat rejection apparatus configured to receive a working fluid at a first temperature, remove heat from the working fluid via the evaporative heat exchanger, and output the working fluid at a lower second temperature, the plume abatement system comprising:
a plume abatement assembly operable to cause mixing of ambient air with the heated air downstream of the evaporative heat exchanger to cool the heated air and abate plume formation, the plume abatement assembly comprising a plume abatement fan;
a controller operatively coupled to the plume abatement assembly, the controller having a plume abatement mode wherein the controller operates the plume abatement assembly including adjusting operation of the plume abatement fan to cause mixing of the ambient air with the heated air to cool the heated air and abate plume in response to:
the second temperature of the working fluid being within a temperature range; and
a determination of a plume formation condition based at least in part on an ambient air variable;
wherein the controller operating the plume abatement assembly includes the controller causing rotation of the plume abatement fan in a first direction; and
wherein the controller is configured to rotate the plume abatement fan in an opposite, second direction in response to:
the second temperature of the working fluid being above the temperature range; and
the primary fan having a speed greater than or equal to a maximum speed of the primary fan.

31. The plume abatement system of claim 30 wherein the controller operating the plume abatement assembly includes increasing a speed of the plume abatement fan.

32. The plume abatement system of claim 30 wherein the controller operating the plume abatement assembly includes increasing a speed of the plume abatement fan to increase an air flow rate of the ambient air for mixing with the heated air in response to:
the second temperature of the working fluid being within the temperature range;
the determination of the plume formation condition; and
a speed of the primary fan being greater than or equal to a maximum speed of the primary fan.

33. The plume abatement system of claim 32 wherein the plume abatement fan includes a first plume abatement fan operable to direct ambient air into the heat rejection apparatus downstream of the evaporative heat exchanger and a second plume abatement fan operable to direct ambient air into the heated air after the heated air is discharged from the heat rejection apparatus; and
wherein increasing the speed of the plume abatement fan to increase the air flow rate of the ambient air includes increasing speeds of the first and second plume abatement fans.

34. The plume abatement system of claim 30 further comprising a sensor operably coupled to the controller and configured to detect the at least one ambient air variable; and
wherein the controller is configured to make the determination of the plume formation condition based on the at least one ambient air variable.

\* \* \* \* \*